US011645538B2

(12) United States Patent
Suski et al.

(10) Patent No.: US 11,645,538 B2
(45) Date of Patent: May 9, 2023

(54) PHYSICAL LAYER AUTHENTICATION OF ELECTRONIC COMMUNICATION NETWORKS

(71) Applicant: Applied Engineering Concepts, Inc., Eldersburg, MD (US)

(72) Inventors: William Charles Suski, Mount Pleasant, SC (US); Christopher Alan Card, Sykesville, MD (US); Brian Richard Few, Sykesville, MD (US)

(73) Assignee: APPLIED ENGINEERING CONCEPTS, INC., Eldersburg, MD (US)

( * ) Notice: Subject to any disclaimer, the term of this patent is extended or adjusted under 35 U.S.C. 154(b) by 324 days.

(21) Appl. No.: 17/177,513

(22) Filed: Feb. 17, 2021

(65) Prior Publication Data

US 2021/0326644 A1    Oct. 21, 2021

Related U.S. Application Data

(60) Provisional application No. 63/011,539, filed on Apr. 17, 2020.

(51) Int. Cl.
*G06N 3/084* (2023.01)
*G06F 18/214* (2023.01)
*G06F 18/2411* (2023.01)
*G06F 18/24* (2023.01)
(Continued)

(52) U.S. Cl.
CPC .......... *G06N 3/084* (2013.01); *G06F 18/214* (2023.01); *G06F 18/2411* (2023.01); *G06F 18/24765* (2023.01); *G06N 3/045* (2023.01); *G06V 10/764* (2022.01)

(58) Field of Classification Search
CPC ........ G06N 3/084; G06N 3/045; G06N 3/044; G06N 5/01; G06N 20/10; G06N 20/00; G06N 3/08; G06N 3/04; G06F 18/214; G06F 18/2411; G06F 18/24765; G06F 2218/00; G06F 21/44; G06V 10/764; G06V 10/82; G06V 40/197; H04L 63/0876; H04L 63/1416; H04L 63/1425; H04L 63/0861; H04L 63/102
See application file for complete search history.

(56) References Cited

U.S. PATENT DOCUMENTS 10,607,077 B1 *   3/2020   Gottemukkula ....... G06V 10/82
10,824,703 B1 *  11/2020   Desai ..................... G06V 40/70
10,891,535 B1 *   1/2021   Mancuso ............ H04L 63/0428
(Continued)

OTHER PUBLICATIONS

"Securing Wireless Communication Using RF Fingerprinting"; Nur Sabryna Aminuddin, 2021 8th International Conference on Computer and Communication Engineering (ICCCE) (Year: 2021).*
(Continued)

*Primary Examiner* — Michael S Osinski

(57) ABSTRACT

A network authentication system can be configured for sampling a plurality of signal samples from a device on a network, providing the plurality of signal samples to a first machine-learned model that is configured to determine a device fingerprint based at least in part on the plurality of signal samples, and providing the device fingerprint to a second machine-learned model that is configured to classify the device based at least in part on the device fingerprint.

20 Claims, 15 Drawing Sheets

(51) Int. Cl.
*G06N 3/045* (2023.01)
*G06V 10/764* (2022.01)

(56) References Cited

U.S. PATENT DOCUMENTS

| | | | | |
|---|---|---|---|---|
| 11,588,850 | B2* | 2/2023 | Ogle | G06N 5/04 |
| 2010/0306249 | A1* | 12/2010 | Hill | G06F 16/9535 |
| | | | | 707/769 |
| 2013/0139263 | A1* | 5/2013 | Beyah | H04L 63/1408 |
| | | | | 726/23 |
| 2013/0159413 | A1* | 6/2013 | Davis | G06Q 50/01 |
| | | | | 709/204 |
| 2013/0167203 | A1* | 6/2013 | Etch | H04L 63/0861 |
| | | | | 726/4 |
| 2013/0242795 | A1* | 9/2013 | Heen | H04L 63/1425 |
| | | | | 370/252 |
| 2015/0237049 | A1* | 8/2015 | Grajek | H04L 67/02 |
| | | | | 726/7 |
| 2016/0226892 | A1* | 8/2016 | Sen | H04K 3/825 |
| 2018/0341857 | A1* | 11/2018 | Lee | G06N 3/04 |
| 2019/0190920 | A1* | 6/2019 | Connell, II | H04W 12/71 |
| 2020/0213352 | A1* | 7/2020 | Fainberg | H04W 12/122 |
| 2021/0021616 | A1* | 1/2021 | Shabtai | H04L 63/1425 |
| 2021/0058415 | A1* | 2/2021 | Sanzgiri | H04L 63/1416 |
| 2021/0092789 | A1* | 3/2021 | Basu Mallick | H04W 24/04 |
| 2021/0281565 | A1* | 9/2021 | Akella | H04L 63/0876 |
| 2021/0357707 | A1* | 11/2021 | Bondugula | G06F 18/2433 |
| 2022/0155773 | A1* | 5/2022 | Kulshreshtha | G05B 23/024 |
| 2022/0188705 | A1* | 6/2022 | Davoodi | G06N 20/20 |
| 2022/0215654 | A1* | 7/2022 | Shlens | G06V 10/82 |
| 2022/0222760 | A1* | 7/2022 | Losinno | G06Q 50/184 |
| 2022/0353276 | A1* | 11/2022 | Hegrat | G06N 5/04 |
| 2023/0023919 | A1* | 1/2023 | Qi | H04W 4/06 |
| 2023/0035291 | A1* | 2/2023 | Suski | G06F 21/31 |

OTHER PUBLICATIONS

"GTID: A Technique for Physical Device and Device Type Fingerprinting"; Sakthi Vignesh Radhakrishnan, IEEE Transactions on Dependable and Secure Computing, vol. 12, No. 5, Sep./Oct. 2015 (Year: 2015).*

"An ANN Based Approach for Wireless Device Fingerprinting"; Kaushal Kumar, 2017 2nd IEEE International Conference On Recent Trends in Electronics Information & Communication Technology (RTEICT), May 19-20, 2017, India (Year: 2017).*

Suski et al, "Using Spectral Fingerprints to Improve Wireless Network Security," Global Telecommunications Conference, Nov. 30-Dec. 4, 2008, New Orleans, Louisiana, 5 pages.

Suski et al, "Radio frequency fingerprinting commercial communication devices to enhance electronic security," International Journal of Electronic Security and Digital Forensics, vol. 1, Issue 3, Oct. 27, 2008, pp. 301-322.

\* cited by examiner

PHYSICAL LAYER AUTHENTICATION OF ELECTRONIC COMMUNICATION NETWORKS

RELATED APPLICATIONS

This application claims priority to and the benefit of U.S. Provisional Patent Application No. 63/011,539, filed Apr. 17, 2020. U.S. Provisional Patent Application No. 63/011,539 is hereby incorporated by reference in its entirety.

FEDERAL RESEARCH STATEMENT

This invention was made with Government support under Contract No. DE-SC0019922, awarded by the U.S. Department of Energy. The Government has certain rights in the invention.

FIELD

The present disclosure relates generally to electronic communication networks. More particularly, the present disclosure relates to security and/or authentication of electronic communications networks.

BACKGROUND

Communication networks can allow computing devices to communicate using a variety of protocols. Network systems can authenticate (e.g., identify) computing devices on a network. Networks can include information technology (IT) networks and operational technology (OT) networks. Networks can define a distribution, with individual devices categorizable as "in-distribution" (ID) or "out-of-distribution" (OOD).

The Open Systems Interconnection (OSI) model represents network systems as a collection of seven layers. Layer 1 is the physical layer, corresponding to, for instance, transmission and reception of raw bit streams over a physical medium. Layer 2 is the data link layer, corresponding to, for instance, transmission of data frames between two nodes connected by a physical layer. Layer 3 is the network layer, corresponding to, for instance, structuring and managing a multi-node network, including, for example, addressing, routing and traffic control. Layer 4 is the transport layer, corresponding to, for instance, reliable transmission of data segments between points on a network, including, for example, segmentation, acknowledgement and multiplexing. Layer 5 is the session layer, corresponding to, for instance, managing communication sessions, i.e., continuous exchange of information in the form of multiple back-and-forth transmissions between two nodes. Layer 6 is the presentation layer, corresponding to, for instance, translation of data between a networking service and an application, including, for example, character encoding, data compression and encryption/decryption. Layer 7 is the application layer, corresponding to, for instance, high-level APIs, including, for example, resource sharing and remote file access.

SUMMARY

Aspects and advantages of embodiments of the present disclosure will be set forth in part in the following description, or can be learned from the description, or can be learned through practice of the embodiments.

Example aspects of the present disclosure are directed to a computer-implemented method for performing device authentication based on physical communication signal characteristics. The method can include obtaining, by a computing system comprising one or more computing devices, a plurality of physical signal samples associated with physical communication signals of a device on a network. The method can include processing, by the computing system, the plurality of physical signal samples with a first machine-learned model to generate a device fingerprint for the device based at least in part on the plurality of physical signal samples. In some implementations, the method can include processing, by the computing system, the device fingerprint with a second machine-learned model to generate an authentication classification for the device based at least in part on the device fingerprint.

In addition, example aspects of the present disclosure are directed to a computing system for network authentication. The system can include one or more sensors configured to collect a plurality of physical signal samples associated with physical communication signals of a device on a network. In some implementations, the system can include one or more non-transitory computer-readable media that collectively store: a first machine-learned model configured to process the plurality of physical signal samples to generate a device fingerprint for the device based at least in part on the plurality of physical signal samples; and a second machine-learned model configured to process the device fingerprint to generate an authentication classification for the device based at least in part on the device fingerprint. The system can include a controller configured to control one or more ports of a network switch or router of the network based on the authentication classification for the device.

Other example aspects of the present disclosure are directed to one or more non-transitory computer readable media that collectively store instructions that, when executed by one or more processors, cause a computing system to perform operations. The operations can include obtaining, by the computing system, a plurality of physical signal samples from a device on a network. In some implementations, the operations can include processing, by the computing system, the plurality of physical signal samples with a first machine-learned model to determine a device fingerprint based at least in part on the plurality of physical signal samples. The operations can include processing, by the computing system, the device fingerprint with a second machine-learned model to generate a classification for the device based at least in part on the device fingerprint, in which the classification comprises an authentication classification.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

Figure 1:
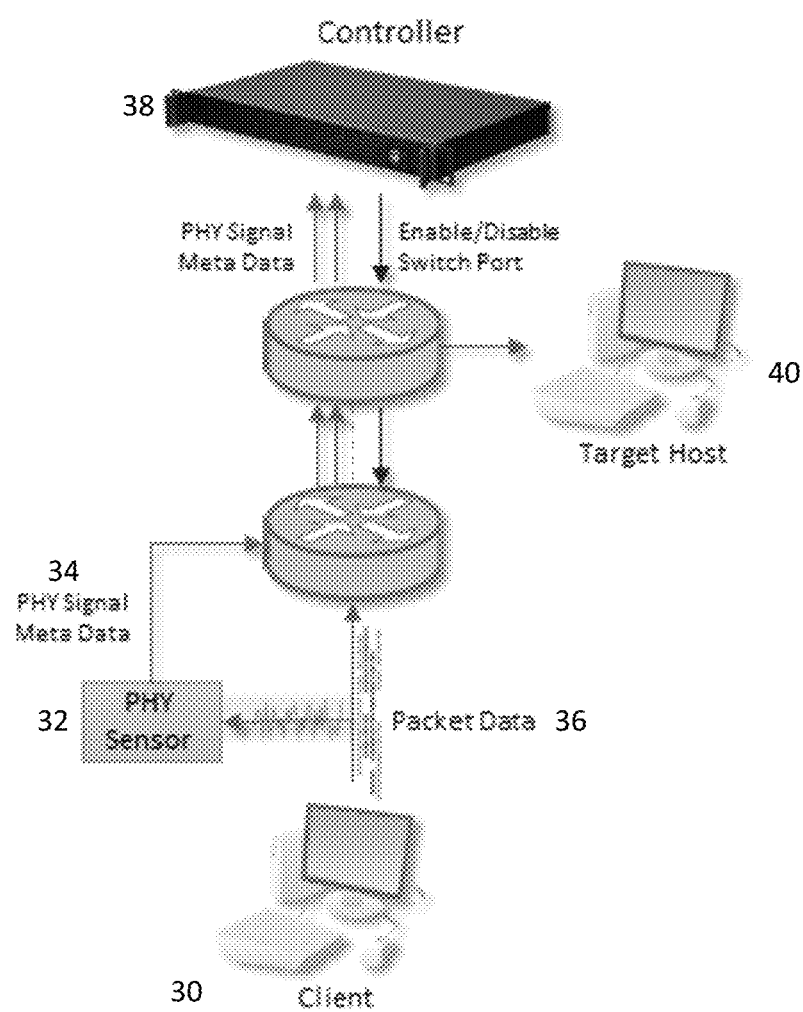
FIG. 1 depicts an example implementation of at least a portion of a network authentication system according to example aspects of the present disclosure.

Reference numerals that are repeated across plural figures are intended to identify the same features in various implementations.

DETAILED DESCRIPTION

Example aspects of the present disclosure are directed to systems and methods for using machine learning to authenticate devices on a network. For instance, systems and methods according to example aspects of the present disclosure can be configured to leverage one or more machine-learned models to generate an authentication classification for a device communicating over a network.

Specifically, based on signals that the device transmits and/or receives, the systems and methods according to example aspects of the present disclosure can determine a device fingerprint associated with the device (e.g., uniquely representative of the device). For example, the data used to authenticate a device can include samples of one or more physical communication signals associated with the device. The physical communication signals can be wired signals or wireless signals. The samples can capture physical data associated with the physical signals, such as a voltage magnitude on a wired connection carrying signals transmitted by the device or characteristics of electro-magnetic emanations transmitted by the device.

Once the device fingerprint has been generated for the device, the systems and methods according to example aspects of the present disclosure can then determine a classification of the device based on the device fingerprint. The classification can be indicative of whether or not the device is an interfering device or an allowed network device, for example. Thus, in some examples, the classification can be a binary classification such as, for example, a binary classification that classifies the device as belonging to the network (e.g., in-distribution) and/or not belonging to the network (e.g., out-of-distribution). Alternatively or additionally, a multi-class classification can be generated such as, for example, a classification that classifies a device into a number (e.g., greater than two) of different threat and/or authentication levels.

The systems and methods according to example aspects of the present disclosure can perform or cause to be performed one or more network controls based on the authentication classification for the device. For example, one or more ports (e.g., in a network switch or router) can be controlled (e.g., opened or closed) to grant the device a level of network access that correlates to the authentication classification for the device.

Generally, the systems and methods disclosed herein can be implemented for authentication classification for network access. For example, a device may be requesting access to a network via a wired or wireless connection. The systems and methods can include obtaining a plurality of physical signal samples from a device on a network (e.g., voltage, signals over 10 BASE-T, signals over 100 BASE-TX, bus signals, radio frequency emanation, electromagnetic emanation, operational RF, antenna interpretation voltage, etc.). In some implementations, the collected physical signal samples can be intended emissions and/or unintended emissions over a wired connection or a wireless connection.

The plurality of physical signal samples can be processed by a first model to determine a device fingerprint. In some implementations, the device fingerprint can be processed by a second model to generate one or more classifications. The first model and/or the second model can be machine-learned models. The one or more classifications can include an authentication classification. The authentication classification can be descriptive of whether and/or what level of authorization the device has on the network. For example, the authentication classification may include a binary result of whether the device is authenticated or not. In some implementations, the systems and methods can include adjusting device access to the network in response to a negative authentication classification.

According to particular aspects of the present disclosure, the device fingerprint can be determined based on samples taken from a physical layer of the network (e.g., hardware). For instance, some systems attempt to identify a device based on higher-level characteristics, such as, for example, medium address control (MAC) addresses, IP addresses, etc. In the case of an interfering device, it can be possible to spoof, or misrepresent, these characteristics. However, by sampling from a physical layer, it can be difficult and/or impossible to misrepresent these characteristics, especially without disrupting the (possibly illicit) function of the interfering device. Thus, determining a device fingerprint based on physical layer characteristics can contribute to improved security of a network. Furthermore, because the systems and methods according to example aspects of the present disclosure can sample from a signal concurrently with transmission of the signal (e.g., by measuring a voltage, current, frequency characteristics, etc.), the systems and methods according to the present disclosure can operate without interference to functions of the network. This can prevent disruptions or crashes, for example, in operation of the network.

For instance, computing systems have experienced a slow migration away from stove-piped and isolated industrial control system (ICS) architectures towards more integrated, highly-connected designs. This migration has contributed to an increase in the attack surface of these systems when viewed from the perspective of cybersecurity. For instance, some information technology (IT) and operational technology (OT) networks share much of the same hardware and communications infrastructure and often the same host operating system software. However, OT networks have more stringent requirements on availability, reliability and data integrity than most corporate enterprise-type networks. Despite these requirements, OT is less commonly equipped with intrusion detection, intrusion prevention, access control, and virus detection systems. This lack of protection from cyber attacks can leave some critical infrastructure vulnerable. Furthermore, some higher layer approaches can require actively probing the network, which can disrupt intended OT network activities. For instance, legacy devices on OT networks performing critical functions may crash due to active port scans.

To solve this and other problems, systems and methods according to example aspects of the present disclosure can classify devices by exploiting intrinsic physical features of the communication signals from these devices. This technique can be referred to as fingerprinting, in reference to the use of unique characteristics of a physical device imprinted on its communication signals, much like human fingerprints. For instance, systems and methods according to example aspects of the present disclosure can monitor electrical signals that are transmitted on a wire or through the air to communicate with other devices and classify those signals as belonging to a particular device, such as an allowable device within the network (e.g., an in-distribution device). In some implementations the communication signals can be electromagnetic signals (e.g., light) and may utilize or be transmitted using fiber optics for communication. These systems and methods can be utilized over a single port or a variety of ports simultaneously. The systems and methods may include collecting one or any number of output signals from a device. In some implementations, these systems and methods can be used in conjunction with systems and methods for fingerprinting based on higher-level infrastructure (e.g., MAC addresses, etc.) to obtain a more complete understanding of a device.

Hyperparameters of the models discussed herein can be selected to provide desirable accuracy, compute time, memory usage, speed of training, etc. For instance, hyperparameters that may be selected can include, but are not limited to, input length (e.g., number of samples), number of hidden layers, width of layers (e.g., number of features), batch size, dataset split, and/or any other suitable hyperparameters.

According to example aspects of the present disclosure, a computing system can sample a plurality of signal samples associated with a network device. For example, in some implementations, the computing system can sample a plurality of signal samples, such as random samples, from a preamble of a communication. As one example, the computing system can sample from a single point within a network (e.g., at an Ethernet connection) and/or from a plurality of points (e.g., at a number of ports within the network, which can include an ADC sampling data from the plurality of ports) to sample the plurality of signal samples. For instance, in some implementations, the computing system (or some portion thereof such as a sensor portion of the system) can be included in a standalone device that couples to one or more points on the network and samples connections (e.g., voltage levels, currents, etc.) at the one or more points on the network. Additionally and/or alternatively, in some implementations, the computing system (or some portion thereof) can be included with (e.g., embedded within) another network device, such as a network switch, router, controller, or the like. In some implementations, the proposed system can be implemented in a single device (e.g., implemented "on-device"). In other implementations, the proposed system can be implemented using multiple devices such as a local sensor device and a remote server system.

Any number of signal samples can be employed in accordance with the present disclosure. In some implementations, a greater amount of signal samples can provide improvement in accuracy up to a certain number of samples, beyond which improvement is marginal, if any. Thus, in some implementations, the number of samples may be selected to be about the number of samples at which the improvement per increase in sample decreases. Additionally and/or alternatively, the number of samples may be selected to limit the effects of overfitting. As one example, a correlation may exist between number of samples and depth of a neural network used for device fingerprint determination, for which the number of samples may be selected to mitigate the effects of overfitting. In some implementations, the number of samples can be about 2000, such as about 2048.

In some implementations, during training of the systems and methods according to example aspects of the present disclosure, some of the plurality of signal samples can be dropped to produce downsampled signal samples. The downsampled signal samples can be used to train and/or produce inferences from, for instance, machine-learned models in the systems and methods. Alternatively or additionally, the systems and methods may utilize digital filtering to aid in training and/or produce inferences from the systems and methods.

Figure 7:
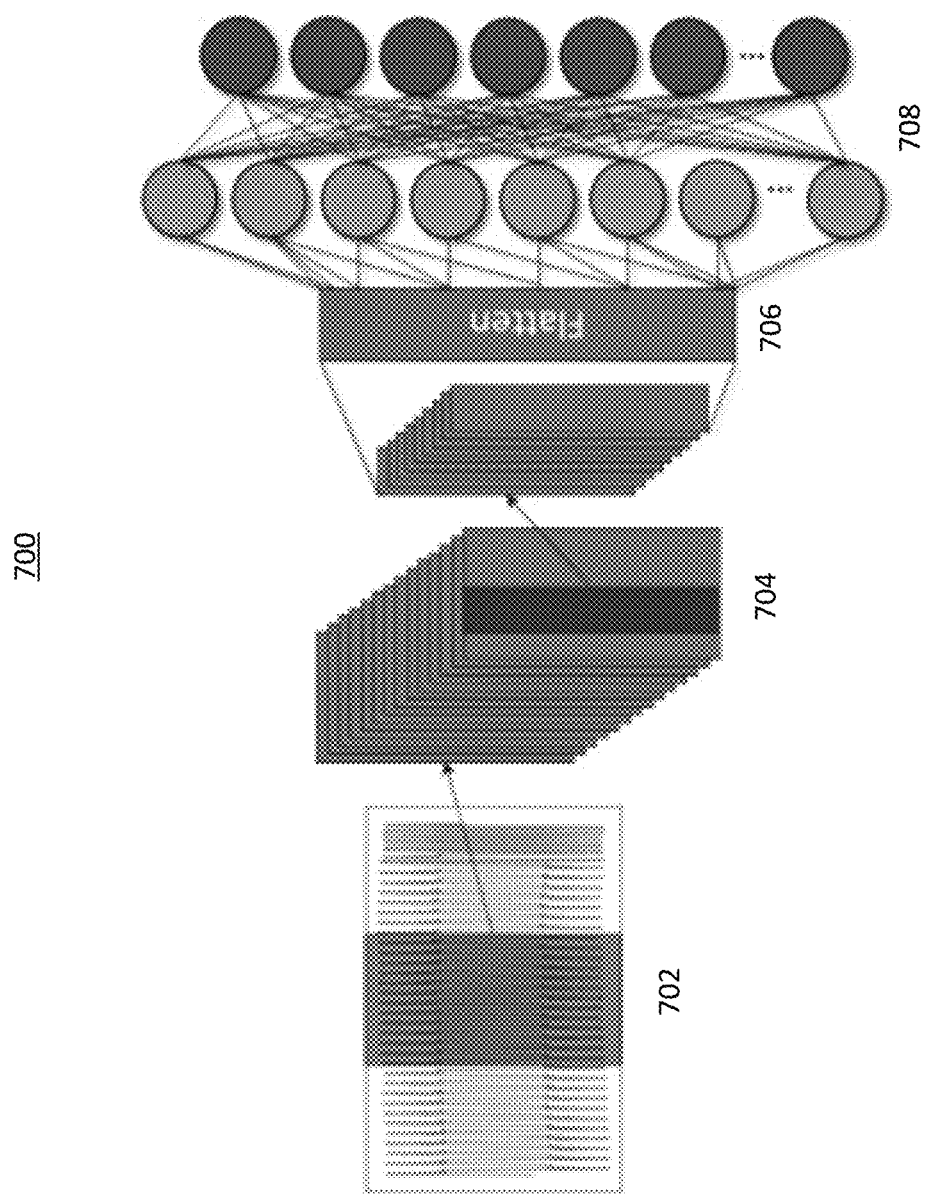
FIG. 7 depicts an example convolutional neural network architecture according to example aspects of the present disclosure.

According to example aspects of the present disclosure, the plurality of signal samples can be provided (e.g., input) into a first modeling component. The first modeling component can be configured to provide a device fingerprint of the device based at least in part on the plurality of signal samples. For instance, in some implementations, the first modeling component can be a machine-learned model, such as, for example, a convolutional neural network (CNN). The CNN can have some number of hidden layers, such as, for example, about 3 and/or about 4 hidden layers. An example CNN is depicted in FIG. 7. In some implementations, the architecture of the first machine-learned model can include an MCNet architecture.

Additionally and/or alternatively, in some implementations, the first machine-learned model can be a residual neural network (RESNET). Residual neural networks can include one or more skip connections. In some cases, residual neural networks can experience lessened vanishing gradients over CNNs and/or provide improved depth capabilities. In some implementations, the first machine-learned model can include and/or receive data from an analog-to-digital converter and a microcontroller. The first machine-learned model may include modulation recognition to determine the device fingerprint. The modulation recognition can include using signal identification (e.g., classifying a signal as a specific protocol standard (10 BaseT/100 BaseTX/802.11g/LTE)) to assist in selecting an appropriate first machine-learned model to fingerprint that signal type.

In some implementations, features of the first machine-learned model can be selected to be specific to the devices. However, the ability to utilize neural network structures without requiring selecting of specific features can be desirable. In some implementations, neural network architectures can be utilized to identify and learn the most salient information for use in generating device fingerprints that can differentiate devices from one another, obviating the need to identify and generate manually-engineered features for each signal type.

The first machine-learned model can include a flattening layer configured to flatten the output of the first machine-learned model into a flattened vector. Additionally and/or alternatively, the first machine-learned model can include dense layers subsequent to the flattening layer. For instance, the first machine-learned model can include one or more linear activation layers subsequent to the flattening layer. For instance, the output of the one or more linear layers (e.g., a plurality of floating point numbers) can be the device fingerprint. In some implementations, the device fingerprint may be an embedding generated by an embedding model of the first machine-learned model.

Moreover, the first machine-learned model can be trained on a set of known devices to generate a set of known device fingerprints. The first machine-learned model can then generate device fingerprints for one or more unknown devices based on a similarity score to each known device of the set of known devices. Therefore, device fingerprints can be generated for both known and unknown devices for logging each device being classified. For example, the first machine-learned model can be trained on twenty known devices (the number twenty simply used as an example), such that if one of these known devices sends signals, the first machine-learned model can provide a very high score indicating that the device is the previously known device, and very low scores associated to the other devices descriptive of the device fingerprint belonging to that specific known device and not the other known devices. Physical signal samples can then be processed by the trained first machine-learned model to output a similarity score relative to each of the twenty known devices. Each individual score related to each known device can be stored as the device fingerprint for the unknown device. In some implementations, upon authentication, a device fingerprint of a formerly unknown device may be added to the set of known devices upon retraining. In some implementations, the first machine-learned model can be trained with some holdback training data to test the determination of device fingerprints of unknown devices. In some implementations, the first machine-learned model may implement a cross-entropy loss function.

Figure 8:
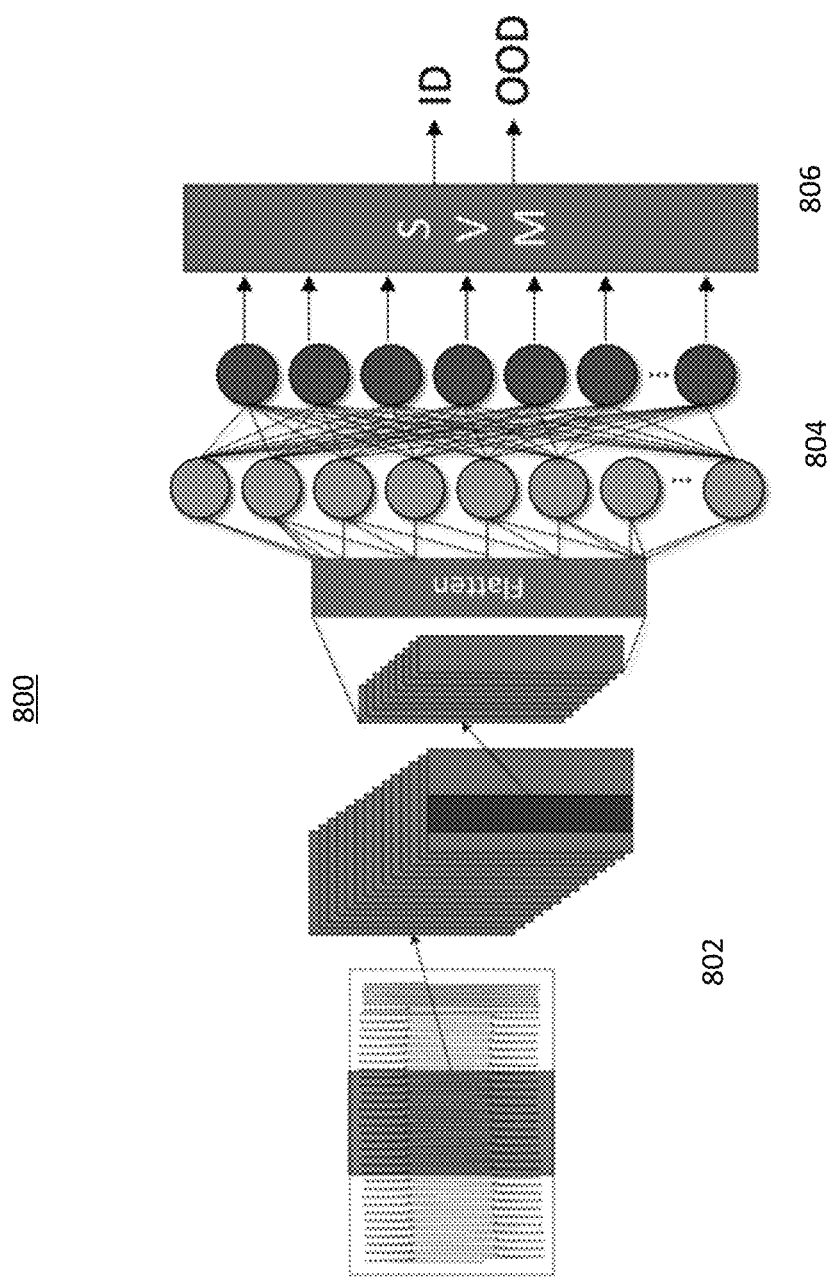
FIG. 8 depicts an example implementation of at least a portion of a network authentication system according to example aspects of the present disclosure.
Figure 9:
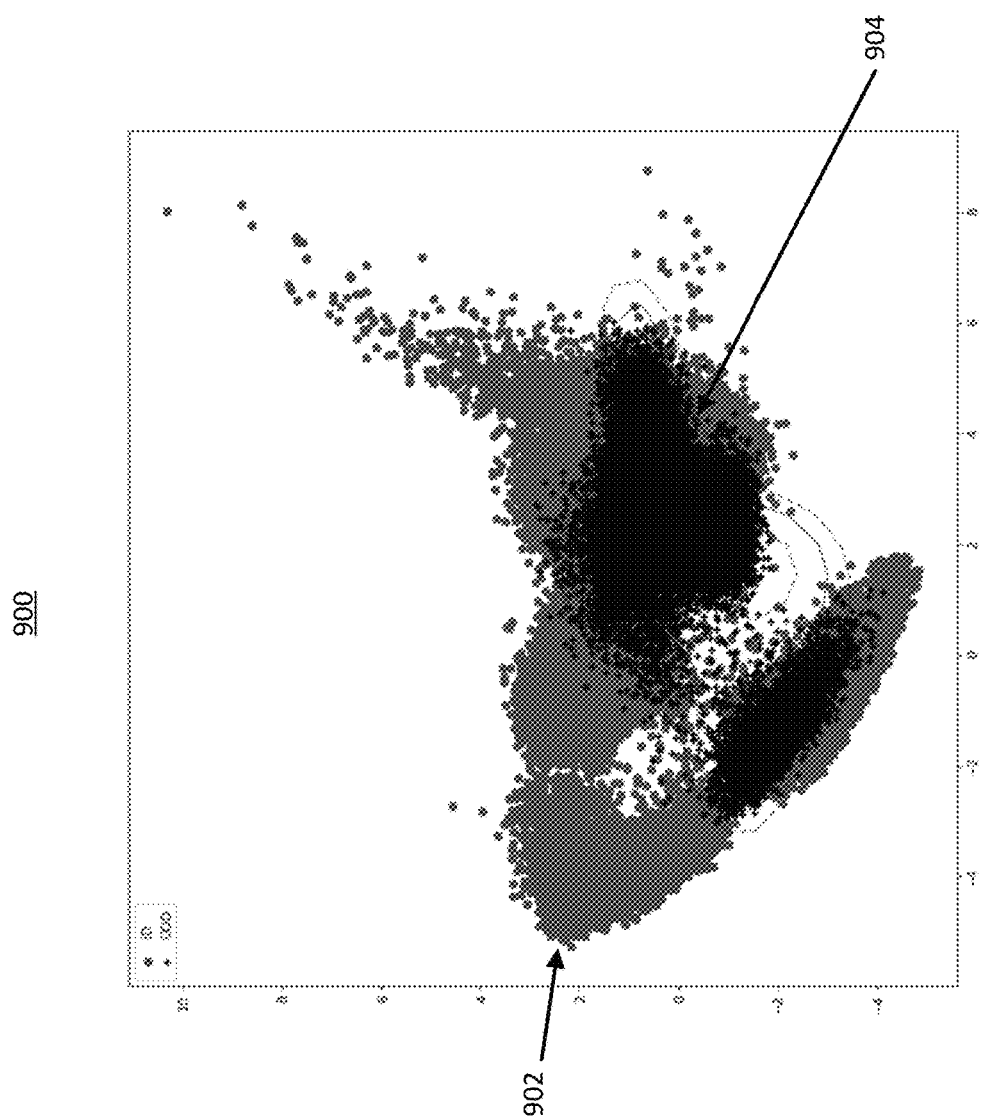
FIG. 9 depicts a plot of an example two-dimensional representation of SVM partitions for an example network authentication system according to example aspects of the present disclosure.

Additionally and/or alternatively, the device fingerprint can be provided (e.g., input) into a second modeling component. The second modeling component can be a second machine-learned model. In some implementations, the second machine-learned model can be a classifier model, such as, for example, a support vector machine (SVM) model. In another example, the second model can be a neural network. The second machine-learned model can be configured to provide a classification of the sampled network device based on the device fingerprint. For example, the sampled network device can be classified as an in-distribution device and/or an out-of-distribution device based at least in part on the device fingerprint. As one example, the second machine-learned model can be trained using training data including device fingerprints labeled with an appropriate classification (e.g., ID and/or OOD). The second model can thus be trained to distinguish between ID devices and OOD devices. Based on the training and in response to receiving a device fingerprint, the second model can thus output a predicted classification associated with the device fingerprint. As one example, example SVM partitions of classifications of 15 devices having 512 samples is depicted in FIG. 9. An example system including a sampling stage, first modeling component, and/or second modeling component is depicted in FIG. 8. The second machine-learned model may be retrained often and may be configured to be retrained quickly.

The second machine-learned model can be trained for authentication prediction. Authentication prediction can include generating one or more classifications based at least in part on the processed device fingerprint. The one or more classifications can include an authentication classification that is descriptive of an authorization prediction. The authentication classification can be a binary prediction of whether the device is authorized or not. The binary prediction can be based on whether the device is determined to be known or unknown by the model. Additionally and/or alternatively, the authentication classification can be a scalar output descriptive of a level of authorization. For example, some devices may be given a limited guest authorization, a semi-restricted employee authorization, or a full authorization with no restriction based on the authentication classification. Authorization level may be based on the assigned authorization, a level of certainty, and/or the amount of information collected from the device.

In some implementations, the second machine-learned model can be trained and retrained through a registration process. The administrator of the system can collect a certain amount of device fingerprints. The device fingerprints can then be processed by the second machine-learned model with labels to generate a retrained model, which can be pushed to the authentication classification system to provide an updated model. Retraining can be completed on a timer basis and/or a quantitative basis based on the amount of devices requesting access. Re-training of only the second model upon registration of a new device can provide for faster re-training and savings of computational costs, for example as compared to re-training of both models or a larger model equivalent to the combination of the two models.

In some implementations, one or more neural networks can be used to provide an embedding (e.g., the device fingerprint) based on the input data (e.g., the samples). For example, the embedding can be a representation of knowledge abstracted from the input data into one or more learned dimensions. In some instances, embeddings can be a useful source for identifying related entities. In some instances, embeddings can be useful inputs for downstream models. For example, embeddings can be useful to generalize input data for a downstream model or processing system. An embedding model can be configured to receive a plurality of inputs and to respectively process each input to produce a respective embedding. In some implementations, an embedding can be a mapping of discrete inputs to continuous vectors or tensors of real numbers in a representational space. Embeddings can describe or represent features or patterns within the inputs. Many machine-learned models configured to categorize or recognize patterns in data employ embeddings (e.g., at their hidden layers).

In some implementations, a classification model can be transformed into an embedding model by training the classification model to perform a classification task and, following such training, removing one or more final layers from the classification model, so that the model provides as its output an embedding that previously was provided at a hidden layer of the model. In other implementations, a model can be directly trained to provide embeddings as its output.

An embedding can be useful for a number of different uses, including, for example, determining a measure of similarity between two different inputs. In particular, a similarity between two or more embeddings respectively associated with two or more inputs or data elements can be indicative of a similarity between the two or more inputs or data elements. Likewise, a dis-similarity between the embeddings can indicate a dis-similarity between the inputs or data elements. In one example, a similarity or relatedness between inputs can be determined by calculating some distance (e.g., a Euclidean distance, an L2 distance, an L1 distance, etc.) between their respective embedding vectors. Other similarity metrics can be used as well. Such measure of similarity can be useful for performing, among other applications, similarity search, entity recognition, or other tasks.

In some implementations, the first modeling component and the second modeling component can be trained separately. The modeling components can be trained on labeled training sets and may be trained using transfer learning techniques.

In some implementations, the systems and methods described herein can be deployed as hardware including a data acquisition stage and/or a processing stage. Example hardware configurations are depicted in FIGS. 1-6 and 10-12. The data acquisition stage can include any number of sensors, multiplexers, couplings, ports, etc. necessary to obtain the plurality of samples as described herein. For instance, in some implementations, the data acquisition stage can include port switching circuitry configured to switch (e.g., randomly switch) between a plurality of ports to obtain the plurality of samples. As one example, the data acquisition stage can include at least one analog-to-digital converter (ADC), a microcontroller or field-programmable gate array (FPGA) to handle initial signal processing, local control, e.g. ADC, Port Switching, and/or memory synchronization, and/or downstream data transport. The data acquisition component's selection can be driven by the bandwidth and sampling rate required to perform device authentication. In some implementations, a bandwidth of about 350 MHz can be sufficient to achieve sufficient accuracy and/or could require a sampling rate of less than 1 GS/s. In some implementations, the data acquisition stage can be incorporated into network devices such as routers and/or switches. An example data acquisition stage is illustrated in FIG. 11.

Additionally and/or alternatively, the processing stage can include computing devices configured to perform processing associated with the systems and methods according to example aspects of the present disclosure. Generally, processing can include two computationally intensive processes: training and inferencing. The training process can occur periodically to keep the models (e.g., deep learning models) up-to-date based on the current set of authenticated devices. This can be performed on, for example, a server-side system containing GPU devices. Each deployment can employ only a single training system and/or a cloud-based training configuration. The inferencing portion of data processing can be performed closer to the network edge with embedded GPU or FPGA devices and/or may be maintained at the server system.

The device authentication process can include a deep learning component which can be performed by a heterogeneous processing solution. In some cases, this can include a central processing unit (CPU) and GPU (e.g., embedded GPU) combination to allow portions of the generic processing to be performed in the CPU and the deep learning inferencing portion to be performed on the GPU. The processing component requirements can be driven by the computational resources required to perform the deep neural network inferencing. This can, in turn, be driven by the size of the deep neural network required to perform device authentication.

Additionally and/or alternatively, the processing stage can be cloud-based. In this configuration, the data acquisition stage, located on-premises, can pass data to a cloud-based processing stage. This can allow the system to take advantage of the scalability provided by cloud-based GPU systems for both training and inferencing. An example processing stage is depicted in FIG. 12.

Figure 10:
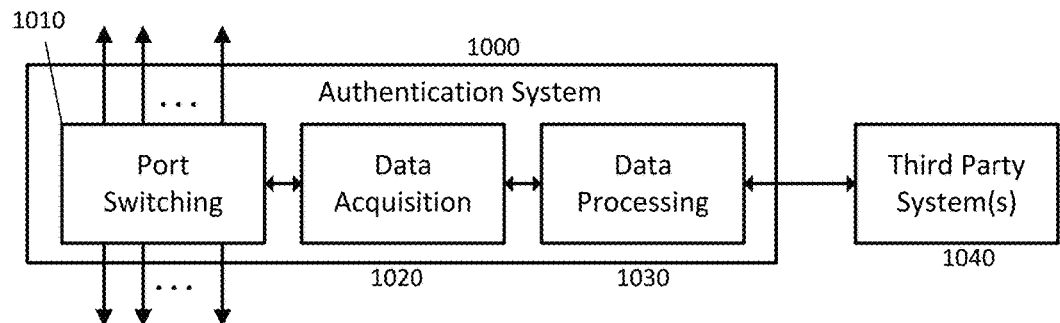
FIG. 10 depicts an example implementation of at least a portion of a network authentication system according to example aspects of the present disclosure.
Figure 11:
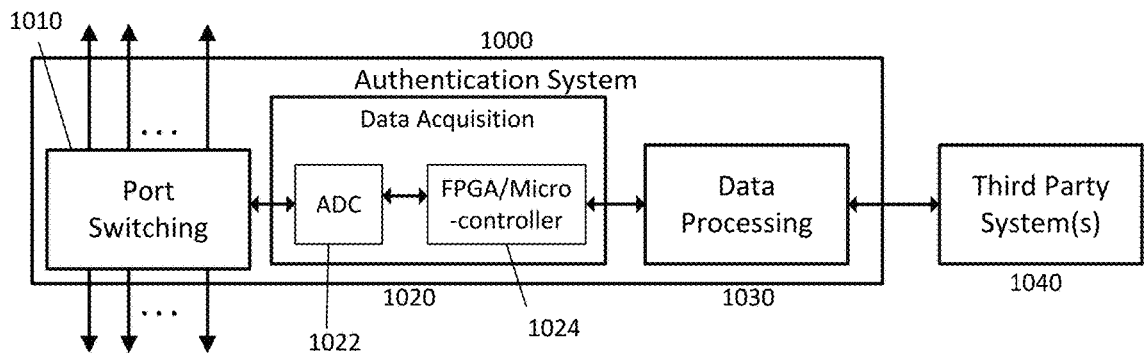
FIG. 11 depicts an example implementation of at least a portion of a network authentication system according to example aspects of the present disclosure.
Figure 12:
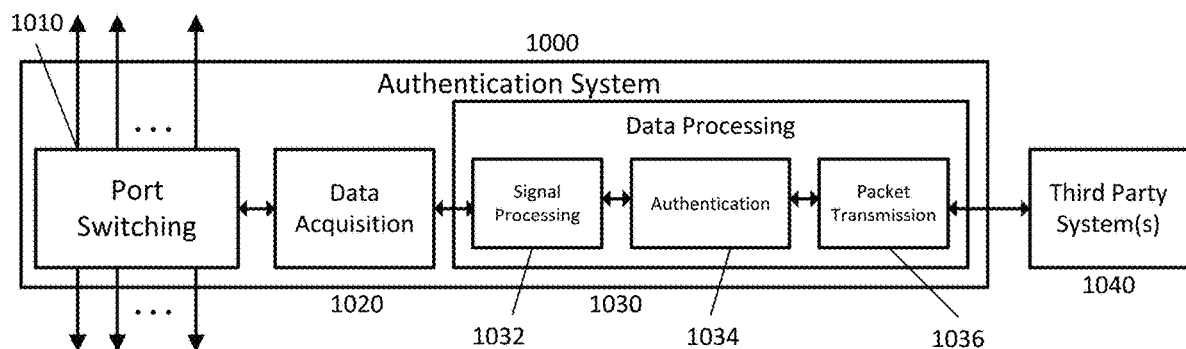
FIG. 12 depicts an example implementation of at least a portion of a network authentication system according to example aspects of the present disclosure.

The Third Party systems depicted in FIGS. 10-12 may be any number of different types of systems such as, for example, logging, intrusion detection, network access control (NAC), or software-defined network (SDN) control plane services, etc.

The systems, methods, and approaches described herein, such as systems including a first modeling component configured to determine a device fingerprint and a second modeling component configured to classify the device fingerprint, can provide several advantages, technical benefits, and/or improvements to computing technology. For instance, the systems and methods described herein can be robust to changes in ID devices. As an example, if a new ID device is introduced into the network, the systems and methods described herein can require retraining only the second machine-learned model, which can, in some implementations, be a less intensive process, while preventing a requirement of retraining the first modeling component, which can, in some implementations, be a more intensive process. Thus, the systems and methods described herein can be robust to changes in ID vs. OOD device arrangements. Additionally and/or alternatively, the systems and methods described herein can provide improved security within a network. For instance, it can be more difficult for OOD devices to spoof or misrepresent information to gain access to a network. Furthermore, employing a second machine-learned model as a classifier can improve accuracy of the ID vs. OOD device classification (e.g., accuracy of greater than 99% may be achieved). As one example, some implementations of the present disclosure can achieve accuracy of greater than 99%, whereas a system configured to identify a specific device (e.g., the first modeling component) may not achieve such accuracy alone.

The systems and methods for authentication classification can be used as a security mechanism to send instructions to a controller to turn on or off access to a port. Authentication classification can be a first line of defense to a network and can be part of a larger scale security system that may track MAC addresses, IP addresses, and/or PKI certificates. Further security protocols can be implemented in other layers including requiring a username and password for access. The systems and methods can protect one port or a plurality of ports. The systems and methods can be applied to network access through a single port or can be applied to many access ports. For example, the systems and methods can be used to protect an entire campus of ports using a centralized stored model. In some implementations, the systems and methods may utilize block-chain to prevent fraudulent authentication. The systems and methods may be implemented as part of software-defined networking architecture.

Computer-readable instructions for completing the disclosed method can be stored and/or implemented on a device or in the cloud. The device can be an all in one device in the form of a router, switch, controller, or other network device with one or more ports and one or more sensors. Alternatively, the device may be implemented as a dongle to be plugged into a network device to protect the network device and the network.

Figure 2:
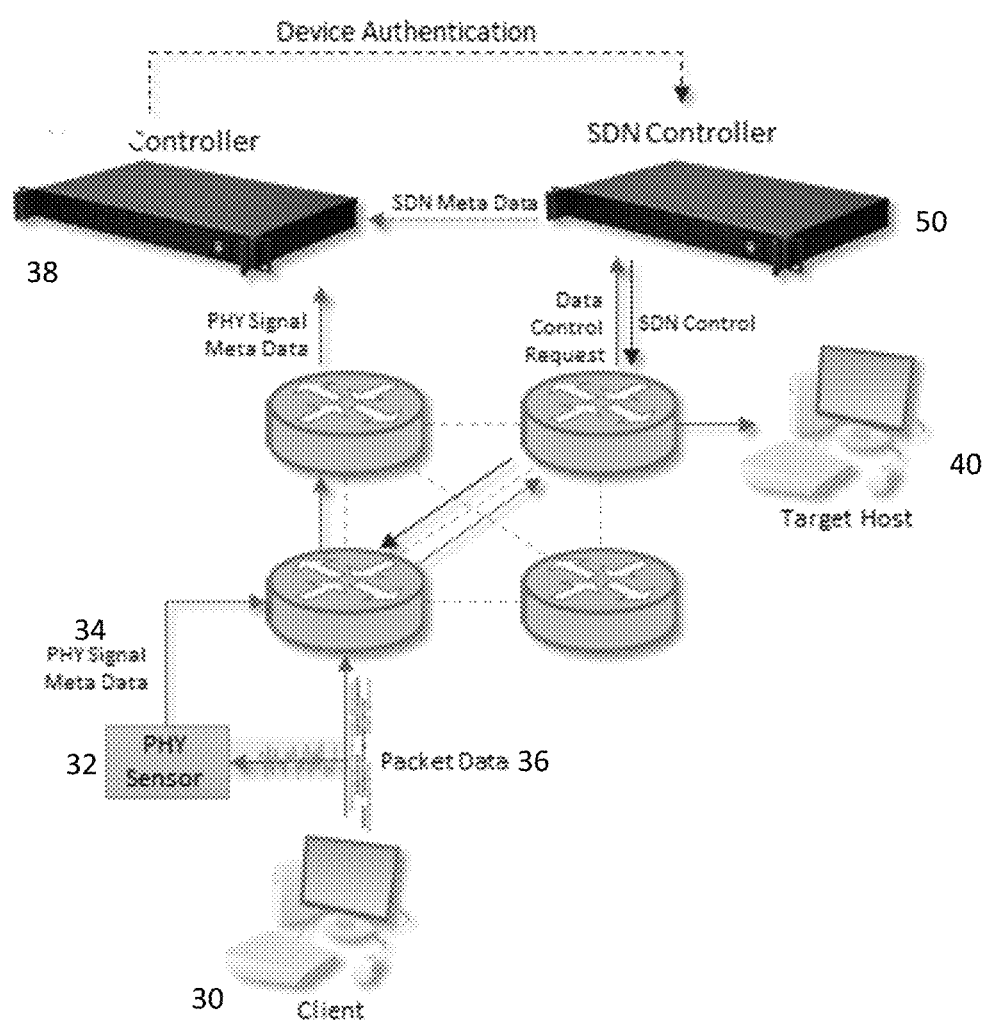
FIG. 2 depicts an example implementation of at least a portion of a network authentication system according to example aspects of the present disclosure.

FIG. 1 depicts an example implementation of an authentication classification system on a traditional network 10, and FIG. 2 depicts an example implementation of an authentication classification system on a SDN network 20. Both systems can include receiving data from a client device 30. The data can include packet data 36 for delivery to a target host 40, and physical metadata 34 obtained with a physical sensor 32. In some implementations, the physical sensor 32 may be recording voltage, electromagnetic emanations, or a variety of other physical signal data.

In a traditional network 10, both the packet data 36 and the physical metadata 34 may be directed to a controller 38 to perform authentication classification based on the physical metadata 34 to determine if the packet data 36 can be sent to the target host 40. Depending on the authentication classification output, the controller 38 may enable or disable a switch port to either allow transmission of the packet data 36 or deny transmission of the packet data 36.

In a SDN network 20, the physical metadata 34 may be directed to a controller 38 similar to the traditional network 10, but the packet data 36 may be directed to a separate SDN controller 50. The controller 38 may process the physical metadata 34 to determine an authentication classification, which can be communicated to the SDN controller 50, which can then instruct the system to either enable or disable the transmission of the packet data 36 to the target host 40.

Figure 3:
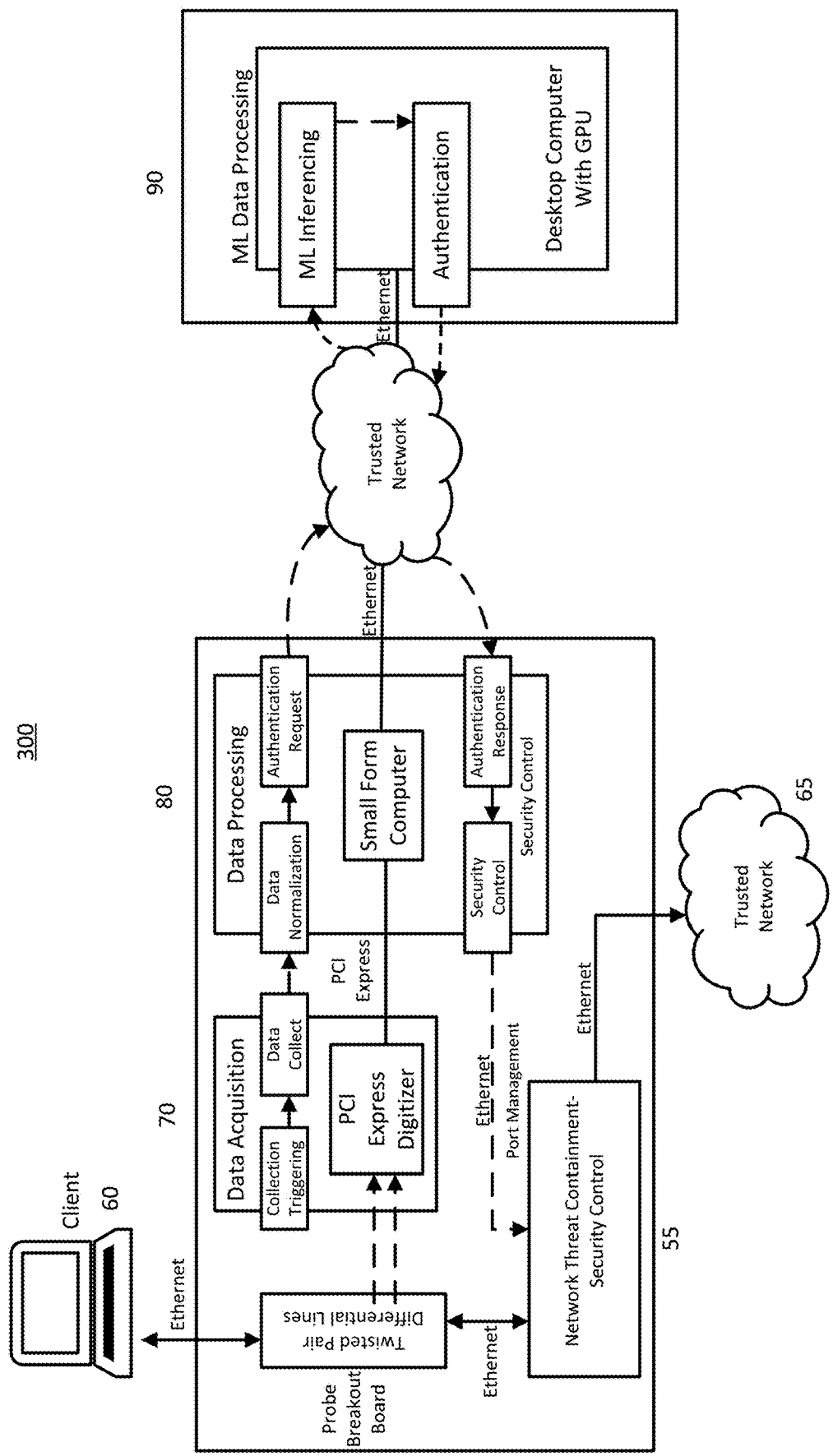
FIG. 3 depicts an example implementation of at least a portion of a network authentication system according to example aspects of the present disclosure.
Figure 4:
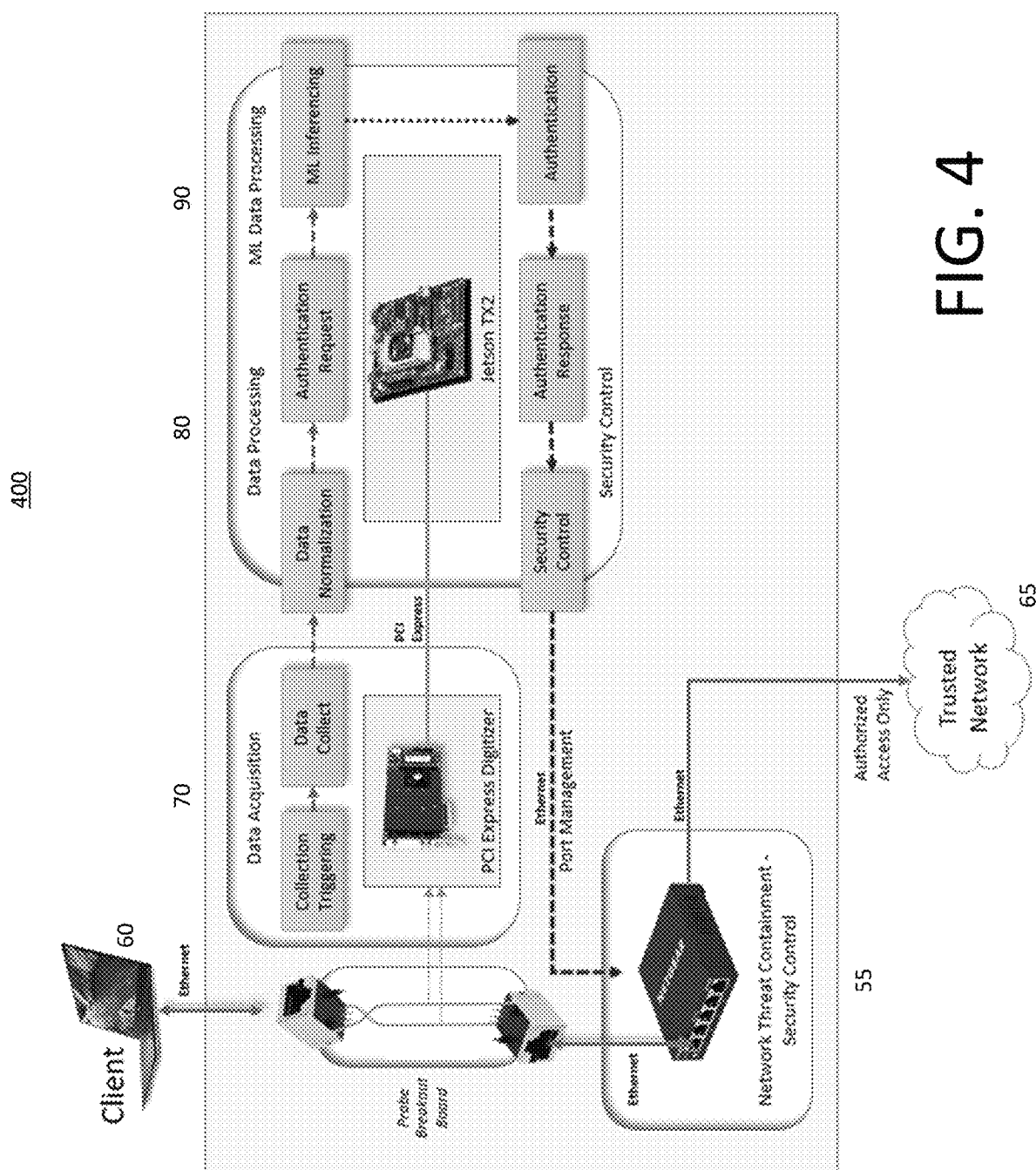
FIG. 4 depicts an example implementation of at least a portion of a network authentication system according to example aspects of the present disclosure.
Figure 5:
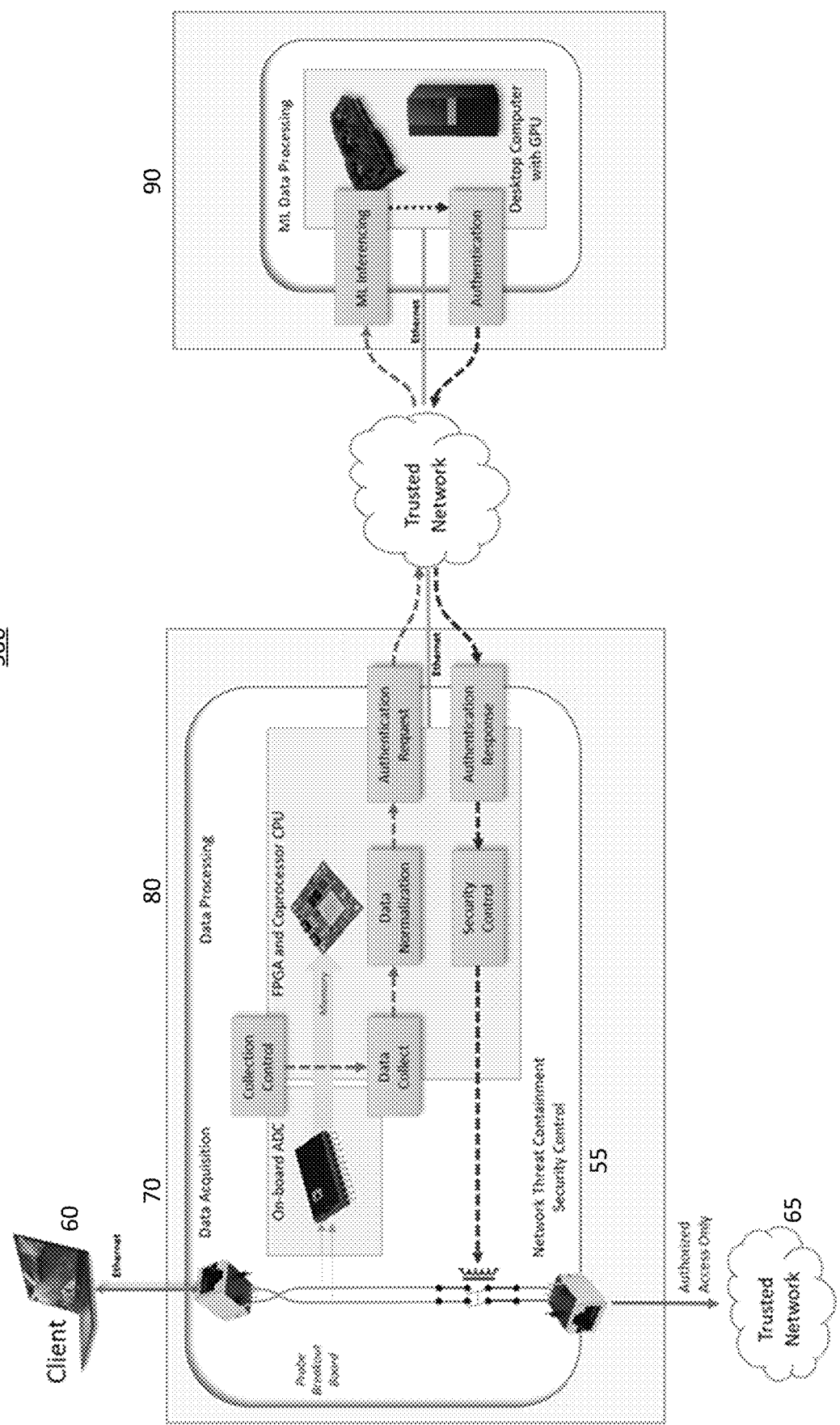
FIG. 5 depicts an example implementation of at least a portion of a network authentication system according to example aspects of the present disclosure.

FIGS. 3-5 depict example implementations of at least a portion of a network authentication system. Each of the depicted implementations includes a client device 60 requesting authorized access to a network 65. Furthermore, each of the implementations include data acquisition 70, data processing 80, and ML data processing 90 for authentication classification that can be communicated to a network threat containment security control 55 to instruct the control 55 whether to provide authorized access or not.

Each depicted implementation varies in configuration and hardware. For example, the authentication system 300 in FIG. 3 includes a PCI Express Digitizer for data acquisition 70, a small form computer for data processing 80, a desktop computer for ML data processing 90, and a router which can enable and disable ports based on the authentication classification. Another example is provided by the authentication system 400 in FIG. 4, in which all steps are completed locally. The authentication system of FIG. 4 includes a PCI Express Digitizer for data acquisition 70, an embedded computer board for data processing 80 and ML data processing 90, and a router which can enable and disable ports based on the authentication classification.

The authentication system 500 of FIG. 5 depicts a port network switch with an on-board ADC, a FPGA, and a coprocessor CPU for completing the data acquisition step 70 and the data processing step 80 of the authentication process. The port switch can be communicatively coupled with a desktop computer over a trusted network. The coupling with the desktop computer can allow for the communication for ML data processing 90 and can provide for quicker retraining. The port network switch and the desktop computer can communicate to process the physical data from the client device 60 to generate an authentication classification to communicate to the network threat containment security control 55 of the switch.

Figure 6:
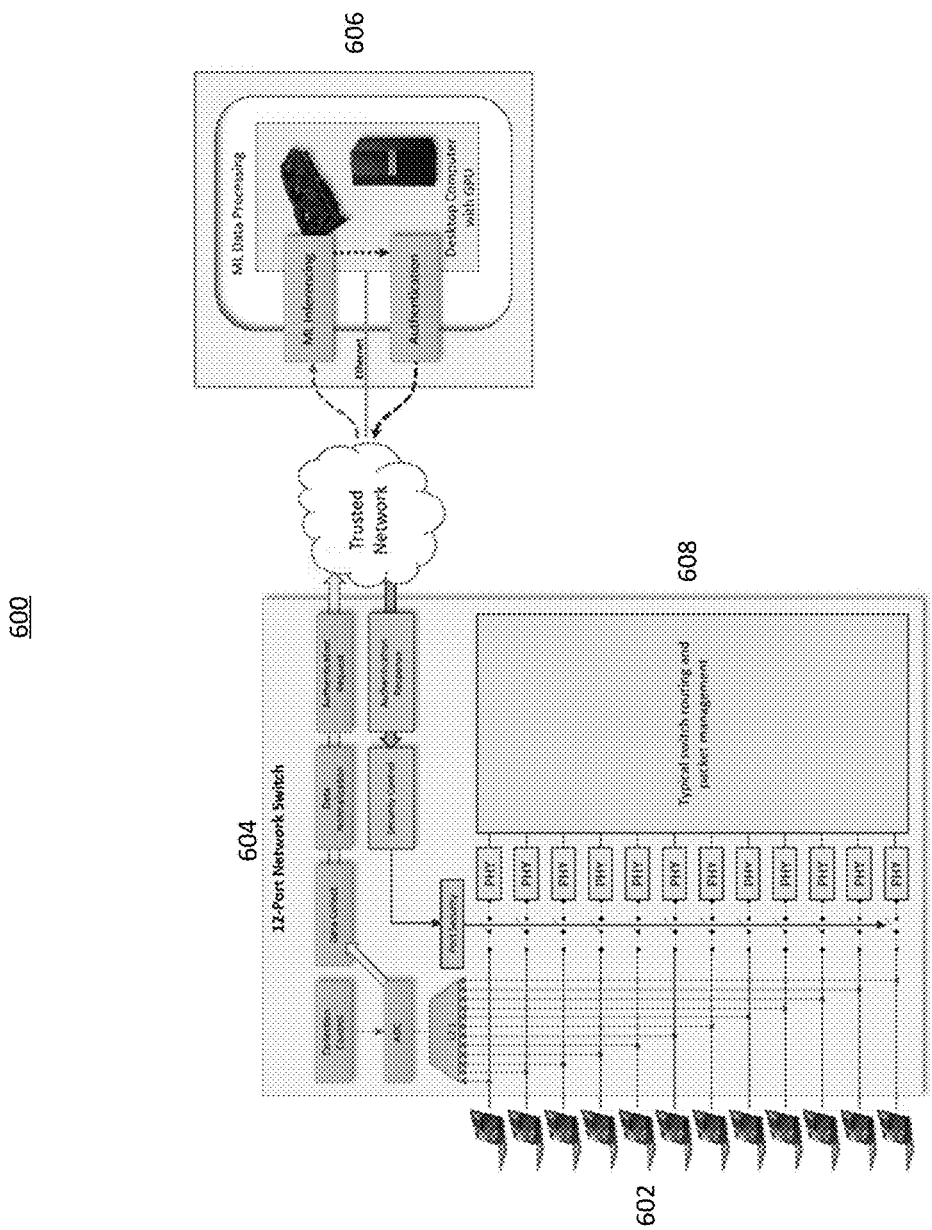
FIG. 6 depicts an example implementation of at least a portion of a network authentication system according to example aspects of the present disclosure.

FIG. 6 depicts an example implementation of a portion of a network authentication system involving communication between a 12-port network switch 604 and a desktop computer 606 over a trusted network to determine if one or more devices should be granted access to a network. The network authentication system can include receiving physical signals from the one or more devices 602. The physical signals can be processed at the 12-port network switch with an analog-to-digital converter to collect a plurality of physical signal samples for each of the one or more devices. The output may be normalized and an authentication request may be sent to a desktop computer 606 for machine-learned data processing. At this stage, the plurality of physical signal samples can be processed to generate a device fingerprint using data collected from known devices. The device fingerprint can then be processed to generate an authentication classification. The authentication classification may then be sent back to the 12-port network switch 604 to implement the authentication response which can be enabling or disabling ports dependent on the authentication classification outcome. The authentication classification can be communicated to the switch security control, which can enable the port, which can allow access to the device 602. Once the device is authenticated, the device can be allowed to access the typical switch routing and packet management 608 of the network.

Moreover, FIGS. 3-6 convey a further breakdown of an example implementation of an authentication system. The system can begin with collection triggering and data collection as part of a data acquisition stage 70 to obtain a plurality of physical signal samples from a client device 60. Collection triggering or collection control can facilitate the collection of data from a device. Data collection can include ADC processing and organizing of the physical signals to generate the plurality of physical signal samples. The next stage can include a data processing stage 80, which can include data normalization and an authentication request sub-stage. The authentication request can be input into a ML data processing stage 90, which can involve ML inferencing and authentication processing. The output of the authentication processing sub-stage can include an authentication classification. For example, the data processing stage 80 and ML data processing 90 can entail or include processing the plurality of physical signal samples with a first-machine learned model and a second machine-learned model to generate the authentication classification. Data normalization and generating an authentication request can include processing the data with a flattening layer and generating a device fingerprint. The device fingerprint can be processed with a ML inferencing model and an authentication classification model of a second machine-learned model to generate the authentication classification. The authentication classification can then be received by the data processing stage 80 to determine an authentication response, which can then be relayed to a security control. The security control may then be used to facilitate access to the network, which can include turning a network port on or off.

FIG. 7 depicts an example implementation of a portion of an authentication system 700. The system can begin with obtaining physical signals 702. The physical signals 702 may be acquired with an analog-to-digital converter to allow for computer processing. The acquired physical signals 702 can include a number of data points. The physical signals can be processed, dissected, and/or organized to generate a plurality of physical signal samples, which can then be processed with a convolution portion 704 of the authentication system. The output of the convolutional portion can include generated features from the processing of the physical signals. The features can then be weighted and combined in the flatten layer 706 and dense layers 708 that follow the convolutional layers 704. In some implementations, the convolutional layers 704, flatten layer(s) 706, and dense layer(s) 708 can be part of a first machine-learned model in which the first machine-learned model includes a convolutional neural network. In some implementations, the output of the first machine-learned model can be a device fingerprint, in which the device fingerprint can include a set of similarity scores associated with a similarity between the client device of the processed signals and known devices.

FIG. 8 depicts an example implementation of a network authentication system 800 with a first machine-learned model 804 and a second machine-learned model 806. Similar to the depicted process in FIG. 7, the example implementation in FIG. 8 includes obtaining and processing physical signals 802 to generate a plurality of physical signal samples. The plurality of physical signal samples can be processed by a convolution portion, a flattening layer, and dense layers of a convolutional neural network 804 to generate a device fingerprint. The device fingerprint can then be processed by a support vector machine model 806 to determine whether the device is in-distribution or out-of-distribution, and therefore, determining whether the device should be provided access to the network. In this example implementation, the first machine-learned model 804 includes a convolutional neural network, and the second machine-learned model 806 includes a support vector machine.

FIG. 9 depicts an example graph of example support vector machine model partitions of classifications for an example implementation of an authentication system in which a second machine-learned model includes a support vector machine model. The depicted graph 900 includes a plot of 15 devices having 512 samples. The depicted graph 900 displays the determined classifications of the device samples with both in-distribution classifications 904 and out-of-distribution classifications 902 depicted based on generated device fingerprints processed by the example second machine-learned model.

FIGS. 10-12 depict block diagrams for an example authentication system. FIG. 10 depicts an example overview of an authentication system 1000 with port switching 1010, data acquisition 1020, and data processing 1030 before the transmission of data to third party systems 1040. The port switching portion 1010 can be used to collect a plurality of physical signals. The plurality of physical signals can be processed by the data acquisition portion 1020 to generate a plurality of physical signal samples that can be processed by the data processing portion 1030 to authenticate a device before data transmission.

FIG. 11 depicts a more detailed block diagram of the data acquisition portion 1020 of the authentication system 1000. In this implementation, the physical signals obtained from the one or more ports 1010 are processed by an analog-to-digital converter 1022. The output of the converter 1022 can then be processed by a field programmable gate array (FPGA) or a microcontroller 1024 before being fed to the data processing 1030 portion of the authentication system 1000 as a plurality of physical signal samples.

FIG. 12 depicts a more detailed block diagram of the data processing portion 1030 of the authentication system 1000. In this implementation, the output of the data acquisition portion 1020 is processed by the data processing portion 1030 of the authentication system 1000. Data processing 1030 can begin with signal processing 1032, which can involve processing the plurality of physical signal samples to generate a device fingerprint based at least in part on known devices. The device fingerprint can then be processed by an authentication model 1034 to generate an authentication classification. In response to the authentication classification, the packet transmission sub-model 1036 may communicate to the third party system(s) 1040. Third party systems 1040 can include network systems that exist on the trusted network, other devices on the trusted network, or any system protected by the authentication system 1000.

Figure 13:
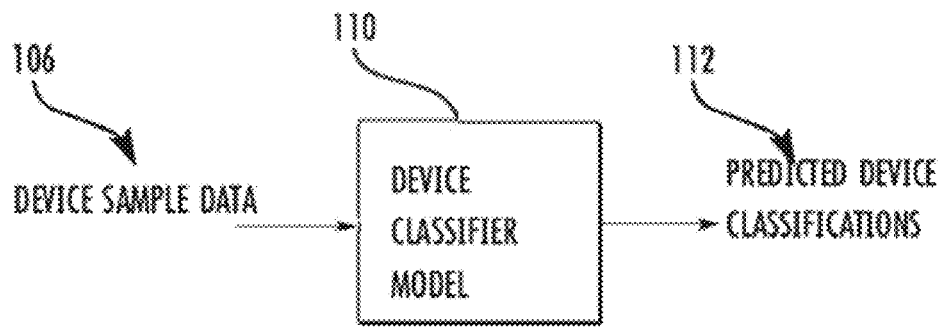
FIG. 13 depicts an example machine-learned model system according to example aspects of the present disclosure.

FIG. 13 depicts an example modeling component according to example aspects of the present disclosure. As illustrated, device sample data 106 can be input to a device classifier model (e.g., the first and/or second modeling components) 110. The device classifier model can be configured to output predicted device classifications in response to the device sample data.

Figure 14:
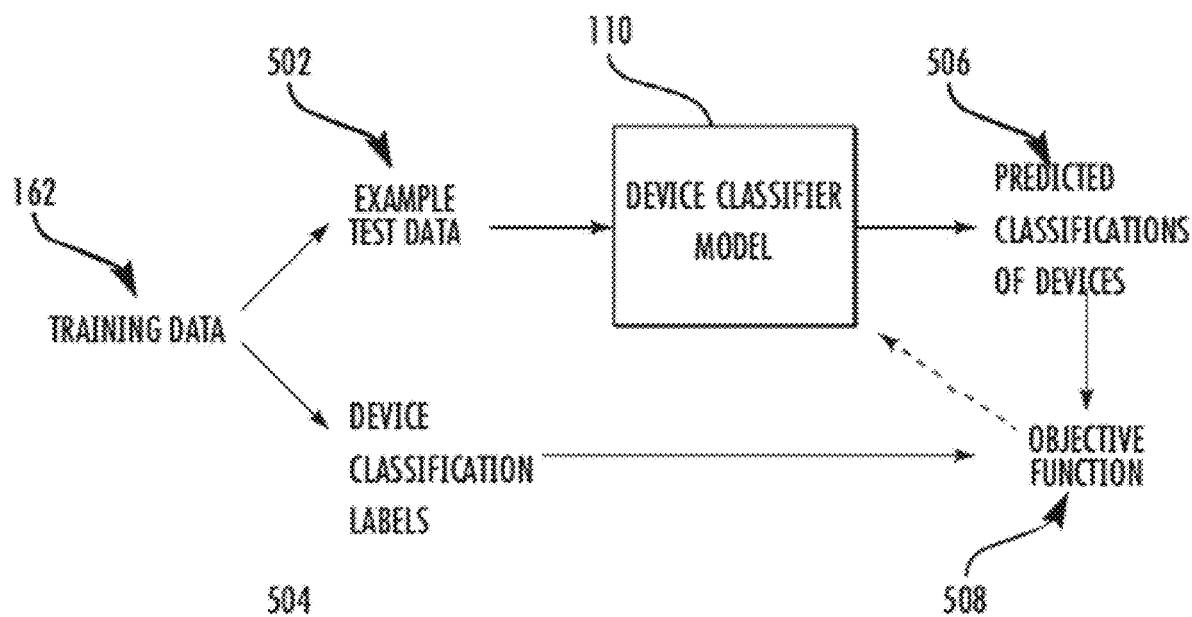
FIG. 14 depicts an example machine-learned model training system according to example aspects of the present disclosure.

FIG. 14 depicts an example workflow for training a device classifier model 110 according to example implementations of the present disclosure. For example, the workflow can be performed by a machine learning computing system (e.g., the model trainer 160 of machine learning computing system 130, as described below with reference to FIG. 15).

Referring still to FIG. 14, in some implementations, the machine-learned device classifier model 110 can be trained on training data 162. The training data 162 can include sets of example test data 502 that are labeled with device classifier labels 504. That is, each set of example test data 502 can have an associated label 504 that describes device classification associated with a device that generated the corresponding example test data 502.

The example test data 502 can include any of the types of test data described with reference to FIG. 1. The device classifier labels 504 can describe the device classification. As one example, the training data 162 can be obtained from sampled ID and OOD devices.

Each set of example test data 502 can be input into the device classifier model 110. In response, the model 110 can output one or more predictions of device classification 506 for each set of example test data 502. An objective function 508 can evaluate a difference between the predictions 506 for each set of example test data 502 and the device classifier label(s) 504 associated with such set of test data 502. For example, the prediction (e.g., ID or OOD) can be compared to the ground truth labels. The objective function 508 can be backpropagated through the device classifier model 110 to train the model 110.

FIG. 14 illustrates one example of a supervised learning workflow. Other training techniques can be used in addition or alternatively to the example workflow shown in FIG. 14.

Figure 15:
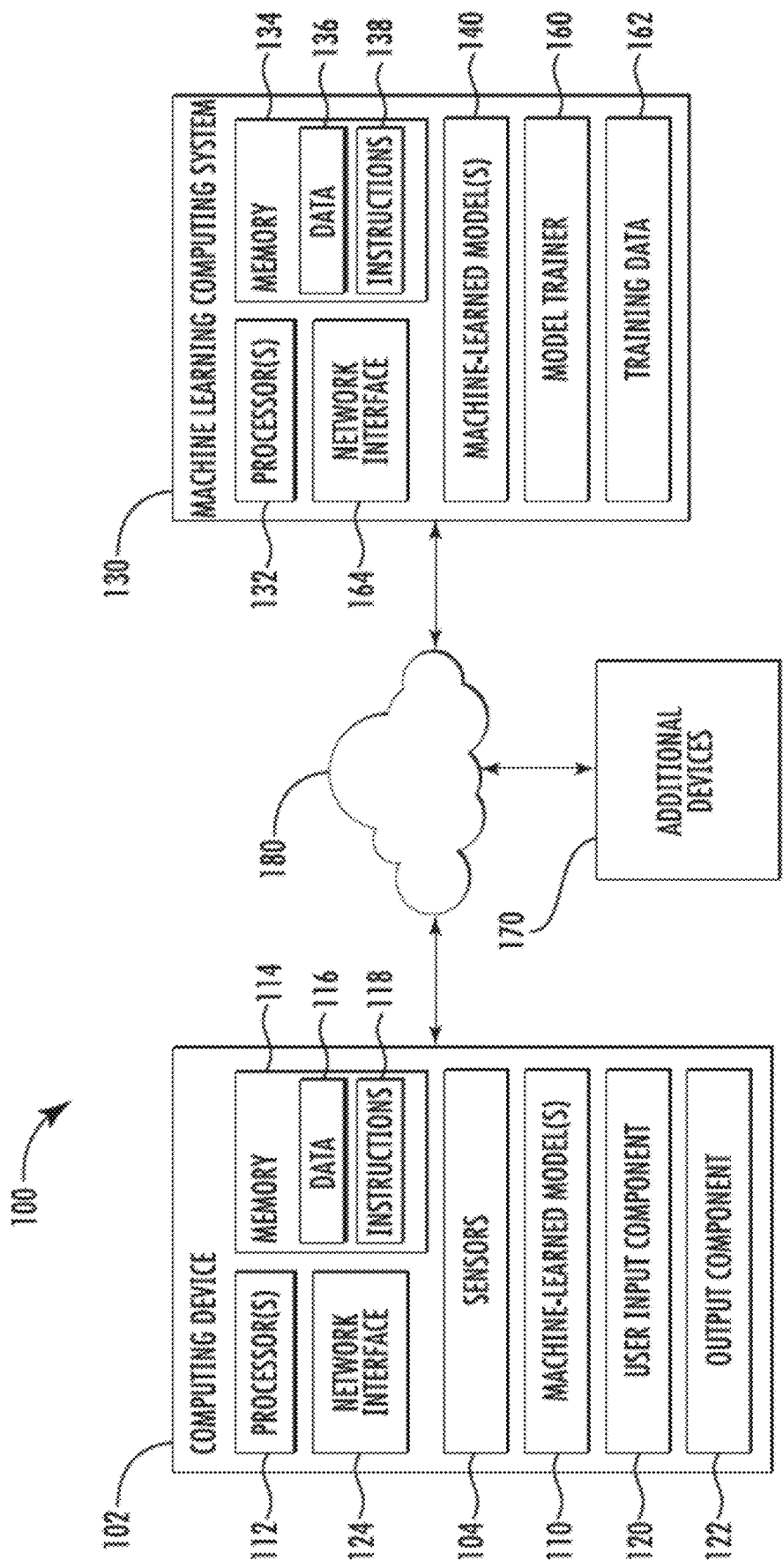
FIG. 15 depicts an example computing system according to example aspects of the present disclosure.

FIG. 15 depicts an example computing system 100 for machine-learning-based identification of device classifiers according to example implementations of the present disclosure. The example system 100 includes a computing device 102 and a machine learning computing system 130 that are communicatively coupled over a network 180.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing device 102 can obtain data from one or more memory device(s) that are remote from the device 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

According to an aspect of the present disclosure, the computing device 102 can store or include one or more machine-learned models 110. For example, the models 110 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

In some implementations, the computing device 102 can receive the one or more machine-learned models 110 from the machine learning computing system 130 over network 180 and can store the one or more machine-learned models 110 in the memory 114. The computing device 102 can then use or otherwise run the one or more machine-learned models 110 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the computing device 102, the machine learning computing system 130 can include one or more machine-learned models 140. For example, the models 140 can be or can otherwise include various machine-learned models such as a random forest classifier; a logistic regression classifier; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

As an example, the machine learning computing system 130 can communicate with the computing device 102 according to a client-server relationship. For example, the machine learning computing system 130 can implement the machine-learned models 140 to provide a web service to the computing device 102. For example, the web service can provide identification of device classifiers as a service.

Thus, machine-learned models 110 can be located and used at the computing device 102 and/or machine-learned models 140 can be located and used at the machine learning computing system 130.

In some implementations, the machine learning computing system 130 and/or the computing device 102 can train the machine-learned models 110 and/or 140 through use of a model trainer 160. The model trainer 160 can train the machine-learned models 110 and/or 140 using one or more training or learning algorithms. One example training technique is backwards propagation of errors ("backpropagation").

In some implementations, the model trainer 160 can perform supervised training techniques using a set of labeled training data 162, for example as described with reference to FIG. 14. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques. The model trainer 160 can be implemented in hardware, software, firmware, or combinations thereof.

The computing device 102 can also include a network interface 124 used to communicate with one or more systems or devices, including systems or devices that are remotely located from the computing device 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The computing device 102 can also include one or more sensors 104. For example, the one or more sensors 104 can include any type of sensor useful to collect data about an environment of the computing device 102.

The computing device 102 can also include a user input component 120. For example, the user input component 120 can include a microphone, a keypad, a keyboard, a click-wheel, buttons, and/or a touch-sensitive screen.

The computing device 102 can also include an output component 122. For example, the output component 122 can include a speaker, a haptic output component, and/or a display (e.g., a touch-sensitive display).

As another example, the computing device 102 can transmit information to one or more additional devices 170 (e.g., network devices, etc.). The computing device 102 can communicate with the additional computing device(s) 170 over the network 180 and/or via a local, short-range wireless communication protocol (e.g., Bluetooth).

The network(s) 180 can be any type of network or combination of networks that allows for communication between devices. In some implementations, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 15 illustrates one example computing system 100 that can be used to implement the present disclosure. Other computing systems can be used as well. For example, in some implementations, the computing device 102 can include the model trainer 160 and the training dataset 162. In such implementations, the machine-learned models 110 can be both trained and used locally at the computing device 102. As another example, in some implementations, the computing device 102 is not connected to other computing systems.

Figure 16:
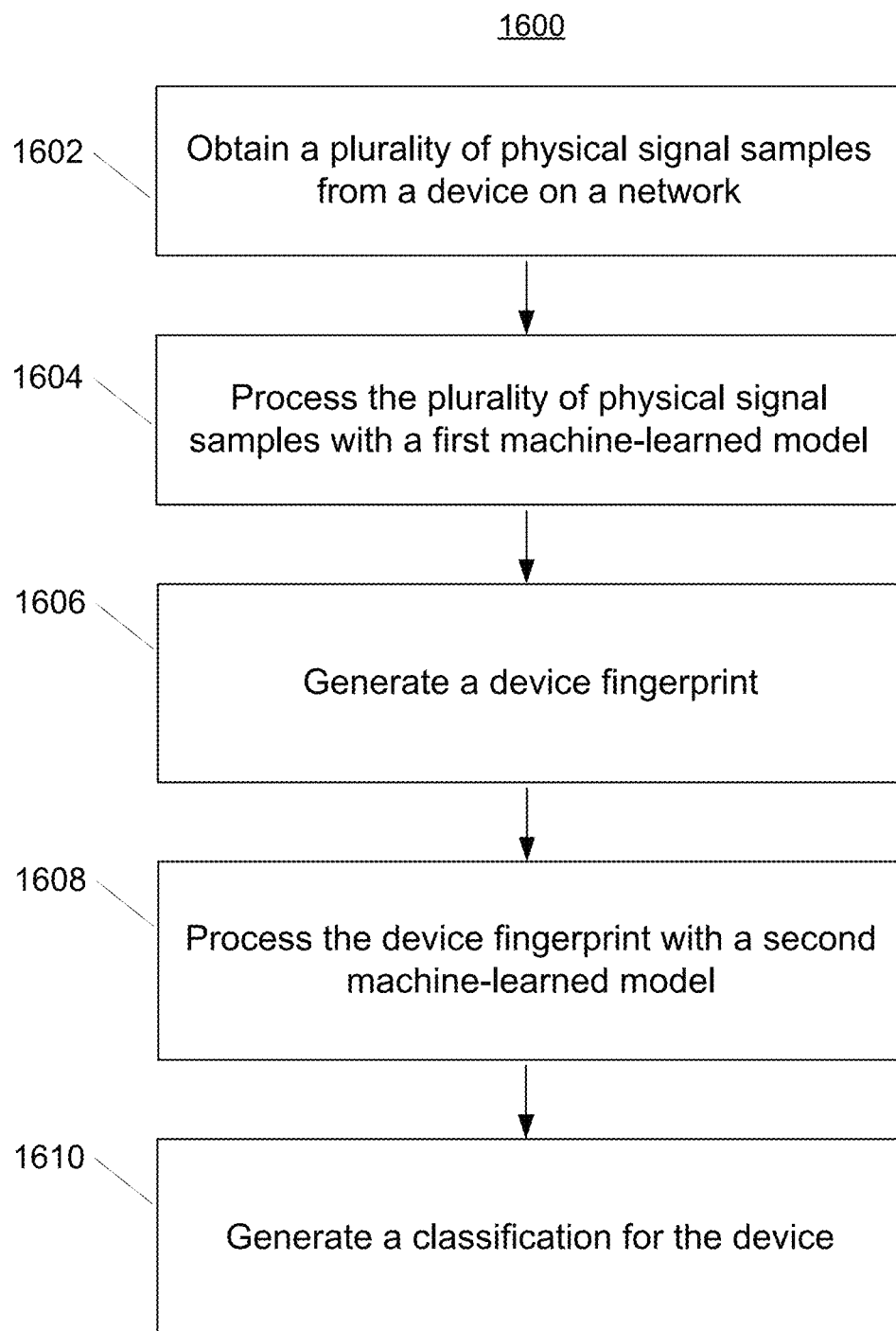
FIG. 16 depicts an example authentication classification method according to example aspects of the present disclosure.

FIG. 16 depicts a flow chart diagram of an example method to perform according to example embodiments of the present disclosure. Although FIG. 16 depicts steps performed in a particular order for purposes of illustration and discussion, the methods of the present disclosure are not limited to the particularly illustrated order or arrangement. The various steps of the method 1600 can be omitted, rearranged, combined, and/or adapted in various ways without deviating from the scope of the present disclosure.

At 1602, a computing system can obtain a plurality of physical signal samples from a device on a network. The plurality of physical signal samples can be associated with physical communication signals of a device on a network. Obtaining the samples can include obtaining one or more physical signals and processing the one or more signals with an analog-to-digital converter to generate the plurality of physical signal samples. In some implementations, the physical communication signals can include electrical voltages transmitted over a wired connection. Additionally and/or alternatively, in some implementations, the physical communication signals can include electromagnetic emanations of the device transmitted over a wireless connection. In some implementations, the physical signals may be optical signals such as fiber optic signals.

At 1604, the computing system can process the plurality of physical signal samples with a first machine-learned model. In some implementations, the first machine-learned model can include a convolutional neural network, a recurrent neural network, a MCNet, or ResNet. The first machine-learned model may be trained to perform a proxy classification task in which the first machine-learned model classifies input samples as being associated with a plurality of classes which respectively correspond to a plurality of observed devices. In some implementations, the first machine-learned model can include a flattening sub-model.

At 1606, the computing system can generate a device fingerprint. The device fingerprint can be based at least in part on the plurality of physical signal samples. The device fingerprint can include a collection of a plurality of classification scores respectively associated with a plurality of known devices.

At 1608, the computing system can process the device fingerprint with a second machine-learned model. The first machine-learned model and the second machine-learned model may be trained separately. In some implementations, the second machine-learned model can include a support vector machine model.

At 1610, the computing system can generate a classification for the device. The classification can be based at least in part on the device fingerprint. The classification can include an authentication classification. The authentication classification can include a determination of whether the device on the network is in-distribution. The classification can include a binary output or a scalar output.

In some implementations, the computing system can adjust access to the network for the device based at least in part on the authentication classification. For example, the computing system may turn off a port in response to a negative authentication classification or may turn on the port in response to a positive authentication classification.

Figure 17A:
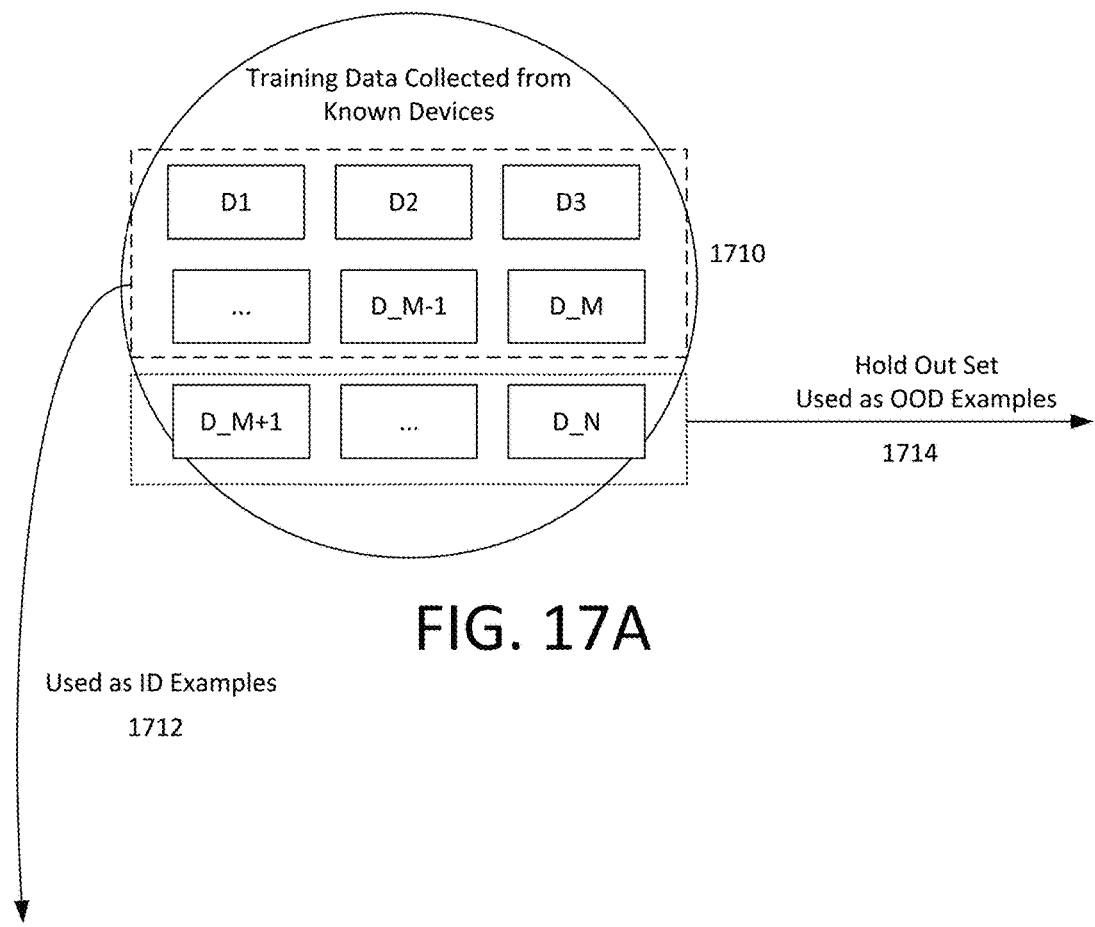
FIG. 17A depicts an example training dataset according to example aspects of the present disclosure.

FIG. 17A depicts an example training dataset for training the first machine-learned model and/or the second machine-learned model. The training dataset can include training data collected from known devices 1710. The data can be collected over a wired connection and/or a wireless connection. The training dataset can include device data for a plurality of devices including a plurality of physical signal data for each respective device.

A first subset of the training dataset can include data that will be used to initially train the machine-learned model(s). A portion of, or all of, the training dataset may be used as ID examples 1712 for training a fingerprint generation model. The first subset can include data from a first device (D1) to data from an mth device (D_M).

A second subset of the training dataset can include a hold out data set 1714. These devices can be used to test the trained model(s) and can be used as example out-of-distribution devices for the network. The second subset can include data for a device (D_M+1) after the mth device to an nth device (D_N).

Figure 17B:
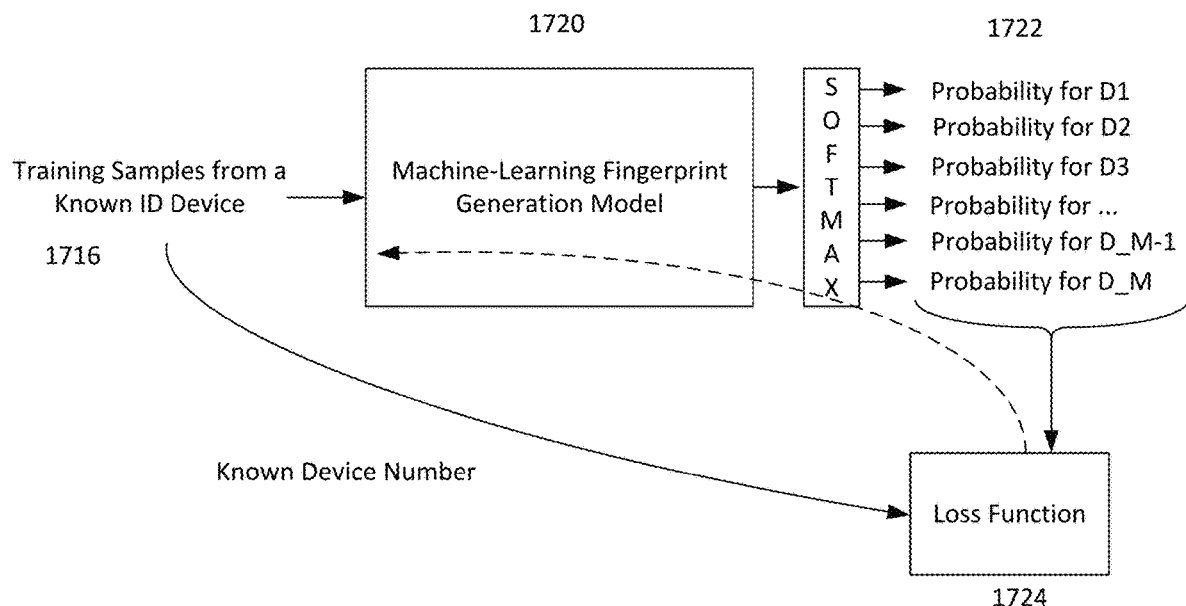
FIG. 17B depicts an example training process for a machine-learned model according to example aspects of the present disclosure.

FIG. 17B depicts a training process for training a machine-learning fingerprint generation model 1720. In some implementations, the trained machine-learning fingerprint generation model 1720 may be included in a first machine-learned model of an authentication system. The training process can begin with obtaining training samples from a known ID device 1716, such as one of the known devices discussed in reference to 1712 of FIG. 17A. Training samples from the known ID device 1716 can be processed by the machine-learning fingerprint generation model to generate an output. The output can be processed by a softmax block to determine a set of probabilities 1722 descriptive of a likelihood the samples 1716 came from one of the known devices included in subset 1712. The set of probabilities 1722 can include a probability score associated with each known device (e.g., D1, D2, D3, ..., D_M−1, and D_M). The set of probabilities 1722 can then be compared with a known device number of the training samples 1716. In some implementations, the set of probabilities 1722 and the known device number may be used to evaluate a loss function 1724 to determine if adjustments to one or more parameters of the model 1720 need to be made (e.g., via backpropagation of the loss function 1724). In some implementations, the loss function 1724 can be a cross-entropy loss function.

After the model 1720 is trained, the machine-learning fingerprint generation model may be used to generate device fingerprints. The device fingerprints can include a set of scores (e.g., the probabilities output after softmax, the logits prior to softmax, and/or other hidden or latent representations generated by hidden or latent layers of the model 1720). In some instances, each score can be associated with one of the one or more known devices.

For example, if one of the known devices provides a plurality of physical signal samples to the machine-learning fingerprint generation model, the model may output one high score and several low scores. The high score can indicate that the samples processed belong to that specific known device. The scores, in the form of a generated device fingerprint, can then be processed by a classification model (e.g., shown as 1726 in FIG. 17C), which can provide a positive authentication classification, which can lead to the sampled device getting network access. However, samples from an unknown device can be processed by the fingerprint generation model to generate a device fingerprint with varying scores, where each score is relatively low compared to the high score of the known device, then the classification model may give a negative authentication classification. A negative authentication classification can indicate an out-of-distribution device, which can lead to limited to no network access being granted to the device.

Figure 17C:
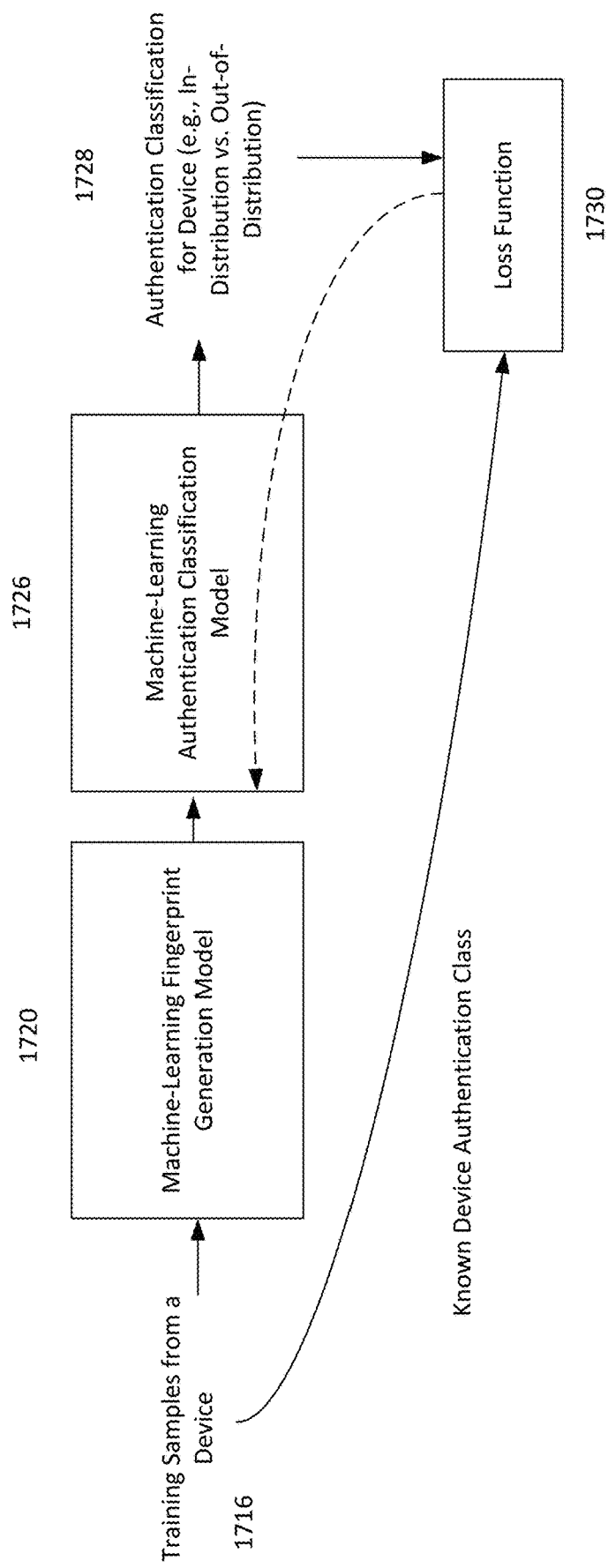
FIG. 17C depicts an example training process for a machine-learned model according to example aspects of the present disclosure.

Thus, the training samples from a known device 1716 (e.g., from the first subset 1712 from FIG. 17A and/or from the second subset 1714 from FIG. 17A) can be further utilized to train one or more machine-learning authentication classification models 1726. For example, FIG. 17C depicts a training process for training machine-learning authentication classification models 1726.

The training process can begin with obtaining those training samples 1716, processing the samples with a machine-learning fingerprint generation model 1720, and generating a device fingerprint. The device fingerprint can be processed by the machine-learning authentication classification model 1726 to generate an authentication classification 1728 for the device. The authentication classification 1728 can be based at least in part on the device fingerprint and can, in some examples, be descriptive of a prediction of whether the device is an in-distribution device or an out-of-distribution device. The authentication classification 1728 can then be compared with a known device authentication class of the device from which the training samples 1716 were collected. In some implementations, the authentication classification 1728 and the known device authentication class may be used to evaluate a loss function 1730 to determine if adjustments to one or more parameters of the machine-learning authentication classification model 1726 need to be made (e.g., via backpropagation of the loss function 1730). In some implementations, the loss function 1730 can be a cross-entropy loss function. Optionally, the loss function 1730 can continue to be backpropagated to also jointly train the fingerprint generation model 1720.

After the classification model 1726 is trained, the machine-learning authentication classification model 1726 can be used to intake device fingerprints and output authentication classifications. The authentication classifications can include whether the samples belong to a device in-distribution or a device out-of-distribution and/or can provide a threat or authentication score among multiple possible levels. In some implementations, the authentication classification can provide a prediction of whether the device is a known or unknown device. The authentication classification can be used to determine if a device is granted access to some or all of a network and/or whether the device has access restrictions. In some implementations, a trained machine-learning authentication classification model 1726 can be included in a second machine-learned model of an authentication system.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing device authentication based on physical communication signal characteristics, the method comprising:
    obtaining, by a computing system comprising one or more computing devices, a plurality of physical signal samples associated with physical communication signals of a device on or attempting to connect to a network;
    processing, by the computing system, the plurality of physical signal samples with a first machine-learned model to generate a device fingerprint for the device based at least in part on the plurality of physical signal samples; and
    processing, by the computing system, the device fingerprint with a second machine-learned model to generate an authentication classification for the device based at least in part on the device fingerprint.

2. The computer-implemented method of claim 1, wherein the first machine-learned model and the second machine-learned model have been trained separately.

3. The computer-implemented method of claim 1, wherein the first machine-learned model has been trained to perform a proxy classification task in which the first machine-learned model classifies input samples as being associated with a plurality of classes which respectively correspond to a plurality of observed devices.

4. The computer-implemented method of claim 1, wherein the authentication classification comprises a determination of whether the device on or attempting to connect to the network is in-distribution.

5. The computer-implemented method of claim 1, wherein the physical communication signals comprise electrical voltages transmitted over a wired connection.

6. The computer-implemented method of claim 1, wherein the physical communication signals comprise electromagnetic emanations of the device transmitted over a wireless connection.

7. The computer-implemented method of claim 1, further comprising: adjusting, by the computing device, access to the network for the device based at least in part on the authentication classification.

8. The computer-implemented method of claim 7, wherein adjusting, by the computing system, access to the network for the device comprises providing restricted access in response to a negative authentication classification or providing a level of authenticated access in response to a positive authentication classification.

9. The computer-implemented method of claim 1, wherein the device fingerprint comprises a collection of a plurality of classification scores respectively associated with a plurality of known devices.

10. The computer-implemented method of claim 1, wherein the authentication classification comprises a binary output.

11. The computer-implemented method of claim 1, wherein the authentication classification comprises a scalar output.

12. The computer-implemented method of claim 1, wherein obtaining, by the computing system, the plurality of physical signal samples from the device on or attempting to connect to the network comprises:
    obtaining, by the computing system, one or more physical signals; and
    processing, by the computing system, the one or more signals with an analog-to-digital converter to generate the plurality of physical signal samples.

13. The computer-implemented method of claim 1, wherein the first machine-learned model comprises a convolutional neural network.

14. The computer-implemented method of claim 1, wherein the second machine-learned model comprises a support vector machine model.

15. A computing system for network authentication, the system comprising:
    one or more sensors configured to collect a plurality of physical signal samples associated with physical communication signals of a device on a network;
    one or more non-transitory computer-readable media that collectively store:
        a first machine-learned model configured to process the plurality of physical signal samples to generate a device fingerprint for the device based at least in part on the plurality of physical signal samples; and
        a second machine-learned model configured to process the device fingerprint to generate an authentication classification for the device based at least in part on the device fingerprint; and
    a controller configured to control one or more ports of a network switch or router of the network based on the authentication classification for the device.

16. The computing system of claim 15, wherein the one or more sensors are physically included within the network switch or router.

17. The computing system of claim 15, wherein the one or more non-transitory computer-readable media are physically included within the controller.

18. The computing system of claim 17, wherein the controller is physically included within the network switch or router.

19. One or more non-transitory computer readable media that collectively store instructions that, when executed by one or more processors, cause a computing system to perform operations, the operations comprising:
    obtaining, by the computing system, a plurality of physical signal samples from a device on a network;
    processing, by the computing system, the plurality of physical signal samples with a first machine-learned model to determine a device fingerprint based at least in part on the plurality of physical signal samples; and
    processing, by the computing system, the device fingerprint with a second machine-learned model to generate a classification for the device based at least in part on the device fingerprint, wherein the classification comprises an authentication classification.

20. The one or more non-transitory computer readable media of claim 19, wherein the first machine-learned model comprises a flattening sub-model.

* * * * *